United States Patent
Nakao et al.

(10) Patent No.: US 9,531,309 B2
(45) Date of Patent: Dec. 27, 2016

(54) DRIVE DEVICE

(71) Applicant: AISIN AW CO., LTD., Anjo-shi, Aichi-ken (JP)

(72) Inventors: Keiko Nakao, Kariya (JP); Ken Iwatsuki, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/898,883

(22) PCT Filed: Mar. 19, 2014

(86) PCT No.: PCT/JP2014/057459
§ 371 (c)(1),
(2) Date: Dec. 16, 2015

(87) PCT Pub. No.: WO2015/011944
PCT Pub. Date: Jan. 29, 2015

(65) Prior Publication Data
US 2016/0126882 A1 May 5, 2016

(30) Foreign Application Priority Data

Jul. 23, 2013 (JP) ................................. 2013-153065
Jul. 23, 2013 (JP) ................................. 2013-153066
(Continued)

(51) Int. Cl.
*H02P 27/04* (2016.01)
*H02P 6/14* (2016.01)
(Continued)

(52) U.S. Cl.
CPC ................ *H02P 6/14* (2013.01); *B60W 10/08* (2013.01); *B60W 10/30* (2013.01); *F15B 11/08* (2013.01);
(Continued)

(58) Field of Classification Search
CPC ............ H02P 27/04; H02P 27/08; H02P 6/18; H02P 4/00; H02P 27/06; H02P 27/00; H02P 25/00; F16H 61/0031; F16H 61/0265
(Continued)

(56) References Cited

U.S. PATENT DOCUMENTS 8,421,388 B2 * 4/2013 Mukai .................. B62D 5/0463
318/400.01
8,544,593 B2 * 10/2013 Uryu .................... B62D 5/0463
180/443
(Continued)

FOREIGN PATENT DOCUMENTS

JP   H09-304447 A   11/1997
JP   H11-155201 A   6/1999
(Continued)

OTHER PUBLICATIONS

Jun. 3, 2014 International Search Report issued in International Patent Application No. PCTJP2014057459.

Primary Examiner — Antony M Paul
(74) Attorney, Agent, or Firm — Oliff PLC

(57) ABSTRACT

A drive device that includes a current sensor that detects a current flowing in the wheel driving rotary electric machine; and shunt resistors that detect currents flowing in the respective second switching element units for the corresponding phases between the direct-current power supply and the second switching element units for the respective phases, wherein a ratio of a period during which current detection can be performed by the current sensor to a control period of the first inverter is higher than a ratio of a period during which current detection can be performed by the shunt resistors to a control period of the second inverter.

20 Claims, 9 Drawing Sheets

| (30) | Foreign Application Priority Data |
|---|---|
| Jul. 23, 2013 (JP) ................................ 2013-153067 |
| Sep. 24, 2013 (JP) ................................ 2013-197530 |

(51) Int. Cl.

| H02P 27/06 | (2006.01) |
|---|---|
| H02M 7/48 | (2007.01) |
| H02P 5/74 | (2006.01) |
| B60W 10/08 | (2006.01) |
| B60W 10/30 | (2006.01) |
| F16H 61/00 | (2006.01) |
| F16H 61/02 | (2006.01) |
| H02K 11/00 | (2016.01) |
| H02P 27/08 | (2006.01) |
| H02P 6/18 | (2016.01) |
| H02M 7/5387 | (2007.01) |
| F15B 11/08 | (2006.01) |
| H02K 5/22 | (2006.01) |
| H02M 1/00 | (2006.01) |

(52) U.S. Cl.
CPC ...... *F16H 61/0031* (2013.01); *F16H 61/0265* (2013.01); *H02K 5/22* (2013.01); *H02K 11/0094* (2013.01); *H02K 11/27* (2016.01); *H02K 11/33* (2016.01); *H02M 7/48* (2013.01); *H02M 7/53875* (2013.01); *H02P 5/74* (2013.01); *H02P 6/18* (2013.01); *H02P 27/06* (2013.01); *H02P 27/08* (2013.01); *F15B 2211/2053* (2013.01); *F15B 2211/20515* (2013.01); *H02M 2001/0009* (2013.01)

(58) Field of Classification Search
USPC .............. 318/400.01, 400.02, 400.07, 400.14, 318/400.15, 700, 701, 727, 799, 599, 430, 432, 318/811, 800, 801; 363/40, 44, 95, 81, 108, 363/120, 174, 175; 388/800, 819, 823
See application file for complete search history.

(56) References Cited

U.S. PATENT DOCUMENTS

| 8,669,731 | B2* | 3/2014 | Uryu ................ B62D 5/0484 |
|---|---|---|---|
| | | | 318/460 |
| 8,981,687 | B2* | 3/2015 | Kuroda ................ H02P 27/06 |
| | | | 318/400.02 |
| 2002/0091470 | A1 | 7/2002 | Sasazawa et al. |
| 2007/0070560 | A1 | 3/2007 | Hikawa et al. |
| 2010/0025126 | A1 | 2/2010 | Nakatsu et al. |

FOREIGN PATENT DOCUMENTS

| JP | 2005-151790 A | 6/2005 |
|---|---|---|
| JP | 2005-192358 A | 7/2005 |
| JP | 2007-166803 A | 6/2007 |
| JP | 2009-228754 A | 10/2009 |
| JP | 2010-011540 A | 1/2010 |
| JP | 2011-067093 A | 3/2011 |
| JP | 2011-125130 A | 6/2011 |
| JP | 2013-051745 A | 3/2013 |
| JP | 2013-059209 A | 3/2013 |

* cited by examiner

FIG. 10
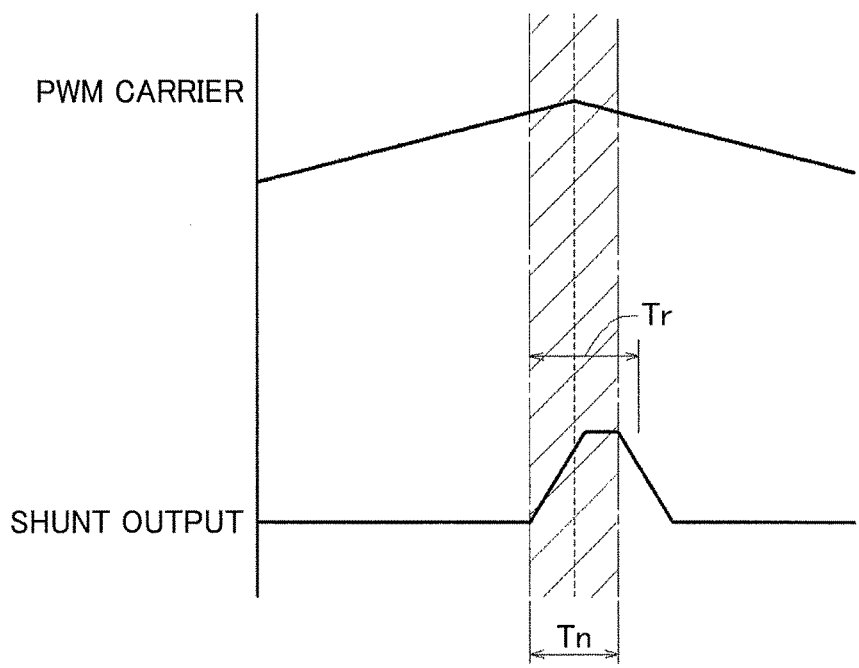
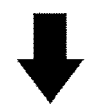
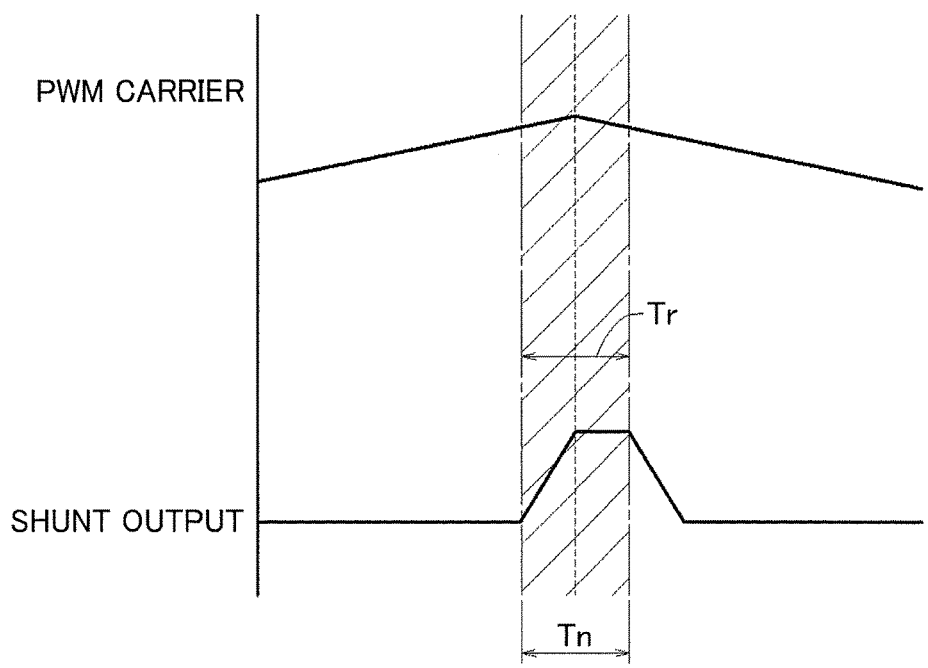

DRIVE DEVICE

BACKGROUND

The present disclosure relates to a drive device including a rotary electric machine and an inverter connected between the rotary electric machine and a direct-current power supply.

A device disclosed in Japanese Patent Application Publication No. 2007-166803 is known as such a drive device as described above. To control drive of a rotary electric machine (motor-generators MG1 and MG2) in such a device, the device needs to be provided with a current sensor for detecting a current flowing in a stator coil of each phase. The conventional current sensor used in the drive device generally uses a Hall element as shown in Japanese Patent Application Publication No. 2007-166803. The sensor using the Hall element has relatively stable temperature characteristics and can accurately detect the current, and hence, is often used to enable accurate drive control of the rotary electric machine in the drive device likely to be subjected to a high temperature environment. The sensor using the Hall element is, however, generally expensive, thereby contributing to an increase in cost.

In the case of, for example, electrical appliances, such as an air conditioner, techniques are known in which a shunt resistor provided in an inverter circuit is used to detect the current flowing in the stator coil of each phase of the rotary electric machine (Japanese Patent Application Publication No. 2011-125130, Japanese Patent Application Publication No. 2005-151790 and Japanese Patent Application Publication No. 2005-192358). The shunt resistor is inexpensive, and hence, the product cost can be lower than that in the case of structuring the rotary electric machine such that the current is detected by the sensor using the Hall element.

The shunt resistor is, however, lower in current detection accuracy and more susceptible to ambient temperature than the sensor using the Hall element. This may prevent desired accuracy from being ensured for the drive control of the rotary electric machine (such as the motor-generators MG1 and MG2 in Japanese Patent Application Publication No. 2007-166803) when the shunt resistor is used to simply reduce the product cost. In particular, in view of the fact that the installation environment of the drive device tends to be of considerably higher temperature than the installation environment of general electrical appliances, using the shunt resistor is liable to reduce accuracy of controlling the rotary electric machine. Hence, in the case of using the shunt resistor for current detection in the drive device, sufficient consideration is necessary as to in what form the shunt resistor is used.

SUMMARY

In view of the above, the product cost of the drive device including the rotary electric machine and the inverter is desired to be lower while giving a smaller influence on the accuracy of controlling the rotary electric machine.

A drive device according to an exemplary aspect of the present disclosure includes a wheel driving rotary electric machine drivingly connected to wheels, a first inverter that is connected to a direct-current power supply and the wheel driving rotary electric machine and performs conversion between a direct current and an alternating current, an alternating-current rotary electric machine that is drivingly connected to a rotating body provided independent of the wheels and in which currents of a plurality of phases flow, and a second inverter that includes second switching element units for respective phases corresponding to the respective phases, and that is connected to the direct-current power supply and the alternating-current rotary electric machine and performs conversion between a direct current and an alternating current. The drive devices includes a current sensor that detects a current flowing in the wheel driving rotary electric machine, and shunt resistors that detect currents flowing in the respective second switching element units for the corresponding phases between the direct-current power supply and the second switching element units for the respective phases, wherein a ratio of a period during which current detection can be performed by the current sensor to a control period of the first inverter is higher than a ratio of a period during which current detection can be performed by the shunt resistors to a control period of the second inverter.

In the present application, the expression "drivingly connected" refers to a state in which two rotational elements are connected to each other so as to be capable of transmitting driving force (synonymous with torque) therebetween. This concept includes a state in which the two rotational elements are connected so as to rotate together with each other and a state in which the two rotational elements are connected so as to transmit the driving force therebetween via one or more transmitting members. Such transmitting members include various members (such as shafts, gear mechanisms, and belts) that transmit rotation at the same speed or at a changed speed, and may include engagement devices (such as friction engagement devices and meshing engagement devices) that selectively transmit the rotation and the driving force.

The term "alternating-current rotary electric machine" represents a rotary electric machine driven by alternating-current power. The term "rotary electric machine" is used as a concept including all of a motor (electric motor), a generator (electric generator), and a motor-generator that carries out both the functions of a motor and a generator depending on the necessity.

The expression "independent of wheels" means that a transmission path of the driving force is independent of the wheels, so that the rotational driving force of the wheels is not transmitted to the transmission path.

With this feature, the shunt resistors detect the currents flowing in the respective second switching element units for the corresponding phases included in the second inverter, so that the product cost can be lower than that in the case in which sensors using Hall elements detect the currents. The alternating-current rotary electric machine controlled by the second inverter is drivingly connected to the rotating body (such as a rotor of, for example, an oil pump, a water pump, or an air conditioner compressor) provided independent of the wheels. For this reason, the alternating-current rotary electric machine is often required to have control accuracy that is not as high as that of the wheel driving rotary electric machine drivingly connected to the wheels. Accordingly, the control accuracy of the alternating-current rotary electric machine can be relatively less affected by using the shunt resistors for the current detection. In addition, serious problems rarely occur even if the ratio of the period during which current detection can be performed by the shunt resistors to the control period of the second inverter is relatively low. By contrast, the wheel driving rotary electric machine is often required to have high control accuracy because the control accuracy affects running characteristics of a vehicle. Hence, to detect the current flowing in the wheel driving rotary electric machine, the current sensor is used, of which the ratio of the period during which current detection can be performed thereby to the control period of the first inverter is higher than the ratio of the period during which current detection can be performed by the shunt resistors to the control period of the second inverter. This configuration can keep the control accuracy of the wheel driving rotary electric machine high. As a result, the product cost can be comprehensively reduced while reducing the influence thereof on the control accuracy of the wheel driving rotary electric machine and the alternating-current rotary electric machine.

As an exemplary aspect of the present disclosure, the wheel driving rotary electric machine is preferably structured such that currents of a plurality of phases flow therein, and the first inverter preferably includes first switching element units for respective phases corresponding to the respective phases, and moreover, the current sensor which is preferably provided at any place on a wiring member connecting corresponding one of the first switching element units for the respective phases to a stator coil of a corresponding phase of the wheel driving rotary electric machine.

This structure allows the currents of the respective phases flowing in the wheel driving rotary electric machine to be detected between the first switching element units for the respective phases and the stator coils of the wheel driving rotary electric machine without being restricted by the period during which current detection can be performed current detection. This configuration can keep the control accuracy of the wheel driving rotary electric machine high.

As another exemplary aspect of the present disclosure, the current sensor is preferably a sensor using a Hall element.

This structure can keep the control accuracy of the wheel driving rotary electric machine high in the drive device that tends to be subjected to a high temperature environment, by using the Hall element that has relatively stable temperature characteristics and can accurately detect a current.

As an exemplary aspect of the present disclosure, the drive device preferably further includes a drive transmission device that operates with hydraulic pressure supplied thereto and controls a transmission state of driving force from the driving force source of the wheels to the wheels, and the rotating body is preferably a rotor of an electric pump that discharges oil supplied to the drive transmission device.

This structure allows the oil discharged by the electric pump to be supplied to the drive transmission device so as to appropriately control the transmission state of the driving force from the driving force source to the wheels. The drive of the rotor of the electric pump drivingly connected to the alternating-current rotary electric machine is controlled while detecting the currents flowing in the alternating-current rotary electric machine using the shunt resistors, so that the state of the drive transmission device can be relatively accurately controlled. The inverter controls the alternating-current rotary electric machine for driving the rotor of the electric pump, so that the state of the drive transmission device can be relatively accurately controlled, and the currents can be detected using low-cost shunt resistors so as to reduce the product cost.

As another exemplary aspect of the present disclosure, the alternating-current rotary electric machine is preferably structured such that N-phase currents (N is a natural number of 2 or more) flow therein; a positive electrode of the direct-current power supply is preferably connected to the second switching element units for the respective phases through a common positive line common to the N second switching element units for the respective phases and N positive branch lines branching from the common positive line and connected to the respective second switching element units for the respective phases, and a negative electrode of the direct-current power supply is preferably connected to the second switching element units for the respective phases through a common negative line common to the N second switching element units for the respective phases and N negative branch lines branching from the common negative line and connected to the respective second switching element units for the respective phases; and the shunt resistors are preferably provided in respective N or (N−1) negative branch lines.

This structure allows a ground electric potential to be used as a reference electric potential by taking advantage of the normal practice of connecting the negative electrode of the direct-current power supply to a ground. As a result, unlike, for example, a structure in which the shunt resistors are provided in the positive branch lines, installation of a circuit for generating the reference electric potential can be omitted, so that the device can be reduced in size. The currents flowing in the respective phases of the alternating-current rotary electric machine can be appropriately detected using the N shunt resistors, or using the (N−1) shunt resistors and utilizing the principle that the sum of instantaneous values of the currents of the respective phases is zero.

In the case of detecting the currents flowing in the respective phases of the alternating-current rotary electric machine using the shunt resistors, a zero point offset needs to be corrected. For devices, such as electrical appliances, subjected to relatively small temperature changes in the use environment, such an offset correction is normally performed only at the start of the devices. Considering applications to the drive device, however, the ambient temperature greatly fluctuates, so that the current detection accuracy may be reduced if the offset correction is performed only at the start of the device.

In view of this, as still another exemplary aspect of the present disclosure, the drive device preferably further includes an inverter control device that controls drive of the second inverter. In the drive device, each of the second switching element units for the respective phases preferably includes an upper switching element and a lower switching element, the upper switching element being provided closer to the positive electrode of the direct-current power supply than a connection part of the switching element unit to the alternating-current rotary electric machine, the lower switching element being provided closer to the negative electrode of the direct-current power supply than the connection part; each of the shunt resistors is preferably provided so as to detect a current flowing in the lower switching element of corresponding one of the second switching element units for the respective phases; and the inverter control device preferably controls the alternating-current rotary electric machine by PWM control by individually controlling switching of the upper switching element and the lower switching element of each of the second switching element units for the respective phases, preferably performs a current detection process of detecting the currents flowing in the alternating-current rotary electric machine based on an electric potential difference between both ends of each of the shunt resistors during a lower full-on period in which the lower switching elements of the second switching element units for the respective phases are all ON, and preferably determines an offset correction amount at a zero point in the current detection process based on the electric potential difference between both ends of each of the shunt resistors during a lower full-off period in which the lower switching elements of the second switching element units for the respective phases are all OFF.

This structure allows simultaneous detection of the currents of the respective phases by utilizing the phenomenon that the current of each phase flows in the lower switching element for the phase during the lower full-on period in which the lower switching elements for the respective phases are all ON. During the lower full-off period in which the lower switching elements for the respective phases are all OFF, the current of each phase flows in the upper switching element for the phase, and does not theoretically flow in the lower switching element. As a result, the offset correction amount at the zero point in the current detection process can be appropriately determined by utilizing the currents detected by the shunt resistors during the lower full-off period in which the current values should be zero in principle. The offset correction can be repeatedly performed by determining the offset correction amount during the lower full-off period repeatedly appearing during the drive control of the alternating-current rotary electric machine. Thus, the drive device can deal with the fluctuation in the ambient temperature. As a result, the detection accuracy in the current detection process can be increased.

As still another exemplary aspect of the present disclosure, the inverter control device preferably individually determines the offset correction amount for each of the shunt resistors in each of a plurality of divided periods defined by dividing an electrical angle period of the alternating-current rotary electric machine.

A study conducted by the inventors of the present disclosure has found that the amounts of the currents detected by the shunt resistors during the lower full-off period are not uniform, but the amounts of the currents of the respective phases flowing in the alternating-current rotary electric machine are correlated with one another. With this structure, the offset correction amount in each of the divided periods is individually determined, so that the appropriate offset correction amount can be determined in accordance with the amount of the current of each of the phases flowing in the alternating-current rotary electric machine. As a result, the detection accuracy in the current detection process can be further increased.

When the structure is employed in which the currents of the respective phases are simultaneously detected during the lower full-on period as described above, the lower full-on period of a predetermined time or longer is preferably secured to ensure correctness of the current detection process. For that purpose, for example, the carrier frequency in the PWM control may be set in advance to a frequency at which the lower full-on period of the certain time or longer can be secured. However, uniformly reducing the carrier frequency may degrade controllability of the alternating-current rotary electric machine, and may generate noise in some cases depending on the relation with the audible range. For this reason, the inverter control device is preferably structured to secure the lower full-on period of the certain time or longer while restraining these problems from occurring.

In view of this, as still another exemplary aspect of the present disclosure, the drive device preferably further includes an inverter control device that controls drive of the second inverter. In the drive device, each of the second switching element units for the respective phases preferably includes an upper switching element and a lower switching element, the upper switching element being provided on the positive electrode side of the direct-current power supply with respect to a connection part of the switching element unit and the alternating-current rotary electric machine, the lower switching element being provided on the negative electrode side of the direct-current power supply with respect to the connection part; each of the shunt resistors is preferably provided so as to detect a current flowing in the lower switching element of corresponding one of the second switching element units for the respective phases; and the inverter control device preferably controls the alternating-current rotary electric machine by the PWM control by individually controlling switching of the upper switching element and the lower switching element of each of the second switching element units for the respective phases, preferably performs a current detection process of detecting the currents of the respective phases flowing in the alternating-current rotary electric machine based on an electric potential difference between both ends of each of the shunt resistors during a lower full-on period in which the lower switching elements of the second switching element units for the respective phases are all ON, and preferably reduces a carrier frequency in the PWM control when the lower full-on period is shorter than a predetermined reference time.

This structure allows simultaneous detection of the currents of the respective phases by utilizing the phenomenon that the current of each phase flows in the lower switching element for the phase during the lower full-on period in which the lower switching elements for the respective phases are all ON. At this time, if the lower full-on period is shorter than the predetermined time, the correctness of the current detection process may be reduced. To solve this problem, the carrier frequency in the PWM control is made dynamically changeable, and is reduced if the lower full-on period is shorter than the predetermined reference time. This configuration can increase the duration time of the ON state of each of the lower switching elements for the respective phases while keeping a duty ratio constant. As a result, the lower full-on period can be increased, so that the correctness of the current detection process can be easily ensured.

As still another exemplary aspect of the present disclosure, the inverter control device is preferably structured such that the carrier frequency can be changed in a continuous manner or a step-like manner, and when the lower full-on period is shorter than the reference time, preferably reduces the carrier frequency to the highest frequency in a range of the changeable carrier frequency at which the lower full-on period is not shorter than the reference time.

With this structure, the lower full-on period can be equal to or longer than the reference time, so that the correctness of the current detection process can be ensured. This structure can also reduce the amount of reduction in the carrier frequency to as small a level as possible, and can thereby reduce the degradation in controllability and the generation of noise of the alternating-current rotary electric machine.

As still another exemplary aspect of the present disclosure, the drive device preferably further includes an inverter control device that controls drive of the second inverter. In the drive device, each of the second switching element units for the respective phases preferably includes an upper switching element and a lower switching element, the upper switching element being provided on the positive electrode side of the direct-current power supply with respect to a connection part of the switching element unit and the alternating-current rotary electric machine, the lower switching element being provided on the negative electrode side of the direct-current power supply with respect to the connection part; each of the shunt resistors is preferably provided so as to detect a current flowing in the lower switching element of corresponding one of the second switching element units for the respective phases; and the inverter control device preferably controls the alternating-current rotary electric machine by PWM control by individually controlling switching of the upper switching element and the lower switching element of each of the second switching element units for the respective phases based on alternating-current voltage commands that are commands for alternating-current voltages of a plurality of phases, preferably performs a current detection process of detecting the currents flowing in the alternating-current rotary electric machine based on an electric potential difference between both ends of each of the shunt resistors during a lower full-on period in which the lower switching elements of the second switching element units for the respective phases are all ON, and preferably reduces a modulation factor representing a ratio of an effective value of the alternating-current voltage commands to a voltage on the direct-current side of the second inverter when the lower full-on period is shorter than a predetermined reference time.

This structure allows simultaneous detection of the currents of the respective phases by utilizing the phenomenon that the current of each phase flows in the lower switching element for the phase during the lower full-on period in which the lower switching elements for the respective phases are all ON. At this time, if the lower full-on period is shorter than the certain time, the correctness of the current detection process may be reduced. To solve this problem, if the lower full-on period is shorter than the predetermined reference time, the modulation factor is reduced by changing the voltage on the direct-current side of the second inverter or the alternating-current voltage commands. This configuration can increase the duration time of the ON state of each of the lower switching elements for the respective phases. As a result, the lower full-on period can be increased, so that the correctness of the current detection process can be easily ensured.

As still another exemplary aspect of the present disclosure, the inverter control device is preferably structured to control the alternating-current rotary electric machine by current vector control, and preferably reduces the modulation factor by performing field-weakening control to adjust the alternating-current voltage commands so as to change a magnetic field generated by stator coils of the alternating-current rotary electric machine to have the direction of weakening a magnetic field flux of a rotor.

With this structure, the modulation factor can be effectively reduced by performing the field-weakening control to reduce the alternating-current voltage commands and the effective value thereof for causing the alternating-current rotary electric machine to generate required torque. The required output torque of the alternating-current rotary electric machine can be ensured while increasing the lower full-on period by reducing the modulation factor.

BRIEF DESCRIPTION OF THE DRAWINGS

FIG. 10 is a schematic diagram showing an adjustment method during the lower full-on period based on a carrier frequency.

DETAILED DESCRIPTION OF EMBODIMENTS

An embodiment according to the present disclosure will be described with reference to the accompanying drawings. A drive device 1 according to the present disclosure is a vehicle drive device (hybrid vehicle drive device) for driving a vehicle (hybrid vehicle) provided with both an internal combustion engine E and a rotary electric machine MG as driving force sources of wheels W. Specifically, the drive device 1 is structured as a drive device for a one-motor parallel type hybrid vehicle.

1. Schematic Structure of Drive Device

Figure 1:
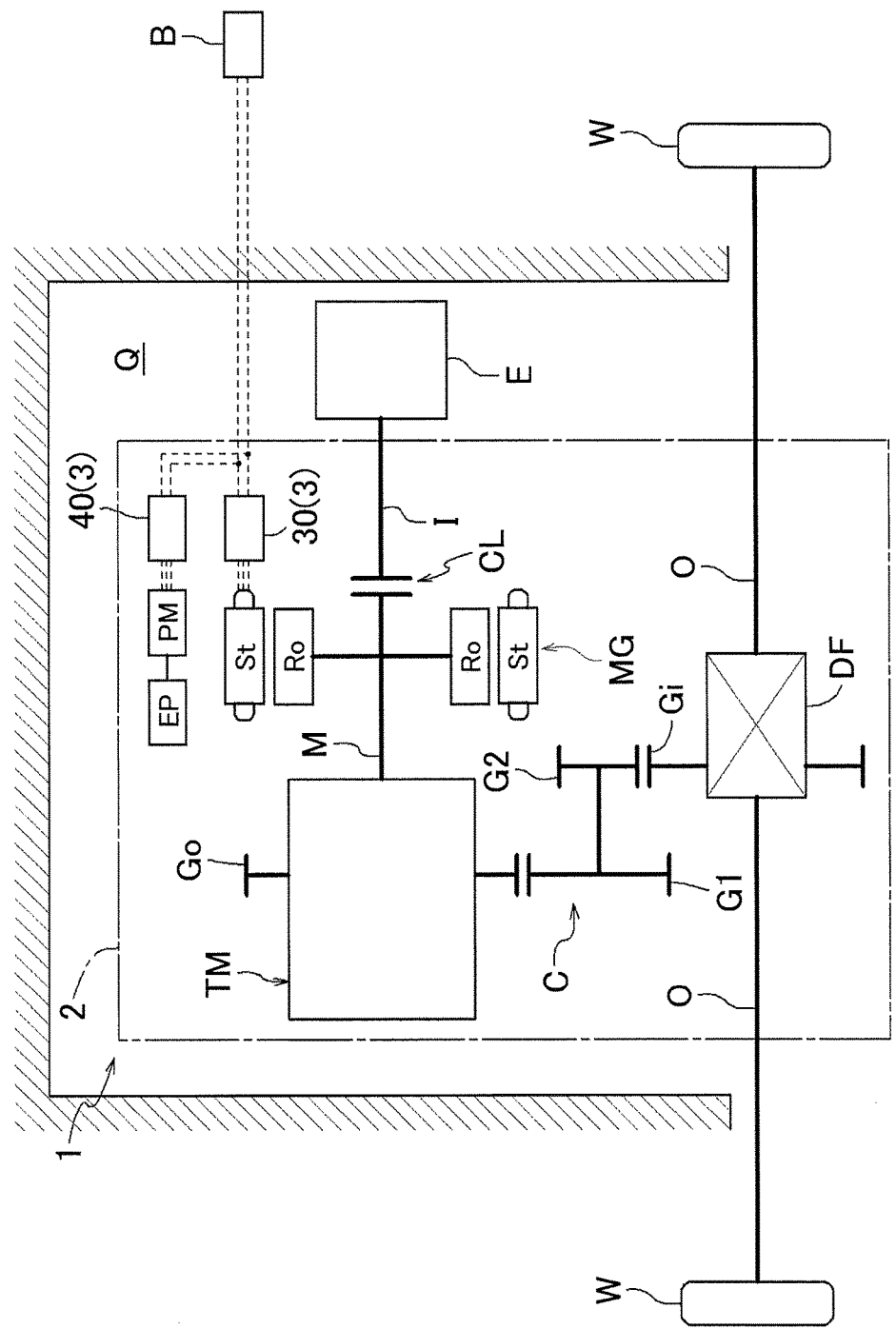
FIG. 1 is a schematic diagram showing a schematic structure of a drive device.

As shown in FIG. 1, the drive device 1 includes an input shaft I as an input member drivingly connected to the internal combustion engine E, output shafts O as output members drivingly connected to the wheels W, the rotary electric machine MG, and a transmission device TM. In the present embodiment, the drive device 1 includes an engagement device CL, a gear mechanism G, and a differential gear unit DF. The engagement device CL, the rotary electric machine MG, the transmission device TM, the gear mechanism G, and the differential gear unit DF are provided in a power transmission path connecting the input shaft I to the output shafts O. These components are provided in the order listed above from the side of the input shaft I. These components are accommodated in a case (drive device case) 2. In the present embodiment, the internal combustion engine E and the drive device 1 are disposed in a driving force source room (engine room, in the present example) Q provided in the vehicle.

The input shaft I, the rotary electric machine MG, and the transmission device TM are coaxially disposed. In the present embodiment, a direction parallel to a rotation center axis common to the components listed above is defined as "axial direction". The input shaft I, the rotary electric machine MG, and the transmission device TM are disposed along the axial direction in the order listed above from the side of the internal combustion engine E. Each of the gear mechanism G and the differential gear unit DF is disposed such that the rotation center axis thereof is parallel to the axial direction and does not coincide with the rotation center axis of the input shaft I and the coaxial components. The drive device 1 having such a multi-axis structure (three-axis structure, in the present example) is suitable, for example, for the case of being mounted on a front-engine front-drive (FF) vehicle.

As shown in FIG. 1, the input shaft (drive device input shaft) I is drivingly connected to the internal combustion engine E. The internal combustion engine E is a motor (such as a gasoline engine or a diesel engine) that outputs mechanical power by being driven by combustion of fuel in the engine. In the present embodiment, the input shaft I is drivingly connected to an output shaft (such as a crankshaft) of the internal combustion engine E.

The engagement device CL is provided in the power transmission path connecting the input shaft I to the rotary electric machine MG. The engagement device CL selectively drivingly connects the input shaft I (internal combustion engine E) to the rotary electric machine MG. The engagement device CL functions as an internal combustion engine disconnection engagement device for disconnecting the internal combustion engine E from the wheels W. The engagement device CL is structured as a hydraulically driven friction engagement device.

The rotary electric machine MG includes a stator St fixed to the case 2 and a rotor Ro rotatably supported radially inside the stator St. The rotary electric machine MG can function as a motor (electric motor) for generating mechanical power using electric power supplied thereto, and as a generator (electric generator) for generating electric power using mechanical power acted thereon. The rotary electric machine MG is electrically connected to an electric storage device B (such as a battery or a capacitor) via a first inverter 30. The rotary electric machine MG performs power running using the electric power supplied from the electric storage device B, or generates the electric power from torque of the internal combustion engine E or an inertial force of the vehicle and supplies the generated electric power to the electric storage device B to charge it. The rotary electric machine MG serves as a "wheel driving rotary electric machine" that outputs driving force transmitted to the wheels W. The rotor Ro in the rotary electric machine MG is drivingly connected to an intermediate shaft M so as to be integrally rotatable therewith. The intermediate shaft M serves as an input shaft (transmission input shaft) of the transmission device TM.

In the present embodiment, the transmission device TM is an automatic stepped transmission device that includes a plurality of gear mechanisms and a plurality of engagement devices for shifting, and can switch between a plurality of shift speeds with different speed ratios. Examples of the transmission device TM may include, but are not limited to, an automatic continuously variable transmission device that can steplessly change the speed ratio, a manual stepped transmission device that includes a plurality of switchable shift speeds with different speed ratios, and a constant-speed transmission device that includes a single shift speed with a fixed speed ratio. The transmission device TM changes the rotational speed of the intermediate shaft M and converts the torque transmitted to the intermediate shaft M in accordance with the speed ratio at each time, and transmits the changed rotational speed and the converted torque to a transmission output gear Go of the transmission device TM.

The transmission output gear Go is drivingly connected to the gear mechanism (counter gear mechanism) C. The gear mechanism G includes a first gear G1 and a second gear G2, each provided on a common shaft member. The first gear G1 meshes with the transmission output gear Go of the transmission device TM. The second gear G2 meshes with a differential input gear Gi of the differential gear unit DF.

The differential gear unit (output differential gear unit) DF is drivingly connected to the wheels W via the output shafts O. The differential gear unit DF includes the differential input gear Gi and a differential body (body of the differential gear unit DF) connected to the differential input gear Gi. In the differential body, the differential gear unit DF distributes and transmits the rotation and the torque supplied to the differential input gear Gi to the two, left and right, output shafts O (that is, the two, left and right, wheels W). In this way, the drive device 1 can transmit the torque of at least one of the internal combustion engine E and the rotary electric machine MG to the wheels W to drive the vehicle.

The drive device 1 includes a mechanical pump (not shown) drivingly connected to the intermediate shaft M. The mechanical pump uses the torque of the internal combustion engine E or the rotary electric machine MG serving as a driving force source to discharge oil while at least one of the internal combustion engine E and the rotary electric machine MG is rotating. In the present embodiment, the drive device 1 further includes an electric pump EP driven by a pump motor PM provided independent of the wheels W. In other words, the pump motor PM is drivingly connected to a rotor of the electric pump EP provided independent of the wheels W. In the present embodiment, the pump motor PM corresponds to an "alternating-current rotary electric machine" in the present disclosure. The rotor of the electric pump EP corresponds to a "rotating body" in the present disclosure. The pump motor PM is electrically connected to the electric storage device B via a second inverter 40.

In the present embodiment, the common electric storage device B serving as a source of electrical power drives the rotary electric machine MG controlled by the first inverter 30 and the pump motor PM controlled by the second inverter 40. The voltage (for example, 100 V to 400 V) of the electric storage device B is higher than the voltage (for example, 12 V to 24 V) of a battery for accessories serving as a source of electrical power for accessories, such as a compressor of an air conditioner and an audio instrument, provided on the vehicle.

The electric pump EP discharges oil using the torque of the pump motor PM in a rotating state. The oil discharged from at least one of the mechanical pump and the electric pump EP is used for generating hydraulic pressure supplied to a hydraulic servomechanism (not shown) of the transmission device TM to control the state of engagement of the engagement devices for shifting included in the transmission device TM. The transmission device TM operates with the hydraulic pressure supplied thereto, and controls the transmission state of the driving force from at least one of the internal combustion engine E and the rotary electric machine MG to the wheels W. In the present embodiment, the transmission device TM corresponds to a "drive transmission device" in the present disclosure.

The oil discharged from at least one of the mechanical pump and the electric pump EP is also used, for example, for cooling the rotary electric machine MG, and for lubricating various parts. Including the electric pump EP allows the present embodiment to supply the oil to the engagement devices for shifting to establish engagement states thereof even while the internal combustion engine E is stopped, so that the vehicle can be appropriately started. The drive device 1 according to the present embodiment can be suitably used as a drive device for a hybrid vehicle having an engine start-stop function.

Figure 2:
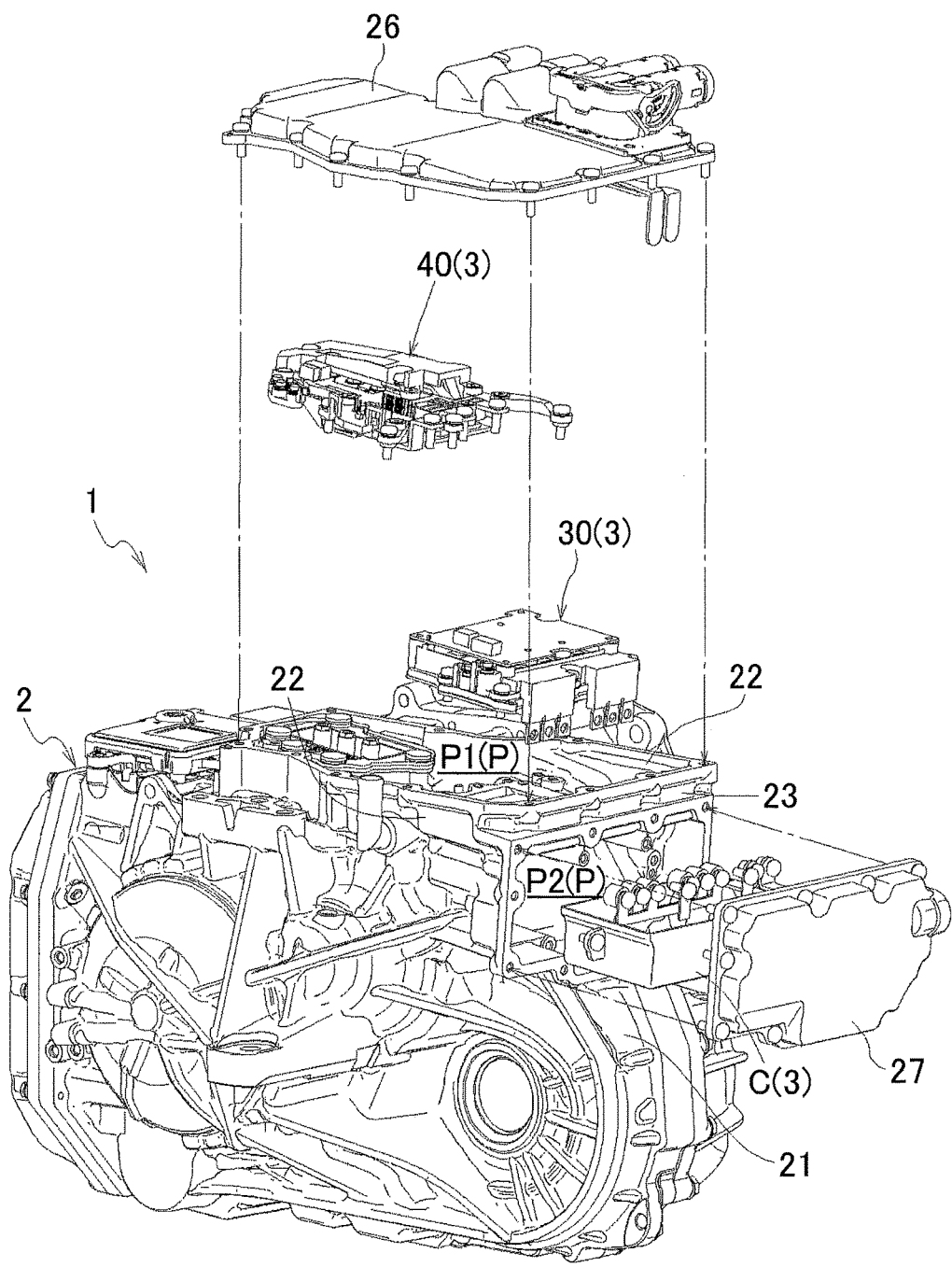
FIG. 2 is an exploded perspective view of the drive device.

As shown in FIG. 2, the case 2 includes an outer peripheral wall 21 formed in a deformed cylindrical shape along the outline of the transmission device TM, the gear mechanism G, and the differential gear unit DF, and also includes a pair of projecting walls 22 oppositely arranged so as to project outward from the outer peripheral wall 21. A space defined by the outer peripheral wall 21 and the pair of projecting walls 22 forms an inverter housing P. The inverter housing P accommodates the first inverter 30 and the second inverter 40 constituting an inverter device 3. In this way, the first inverter 30 and the second inverter 40 are integrally fixed to the case 2 (outer peripheral wall 21).

In other words, the first inverter 30 and the second inverter 40 are directly fixed to and integrated with the case 2 not via an inverter case for accommodating the first inverter 30 and the second inverter 40. That is, the drive device 1 according to the present embodiment employs an "inverter-caseless" structure. Such an inverter-caseless structure need not be provided with a dedicated inverter case, and also need not be provided with a fixing seat for fixing the inverter case to the case 2. This structure can reduce cost through reduction in the number of components. The overall size of the device can also be reduced.

As shown in FIG. 2, the case 2 in the present embodiment includes a columnar or planar beam part 23 connecting the pair of projecting walls 22 to each other. The case 2 also includes a thick plate-like isolation wall (not shown) extending from the outer peripheral wall 21 toward the beam part 23. The isolation wall divides the inverter housing P into a first housing portion P1 and a second housing portion P2. The first housing portion P1 accommodates the first and the second inverters 30 and 40. The second housing portion P2 accommodates a capacitor C constituting the inverter device 3. In that state, the first housing portion P1 is covered with a first cover 26, and the second housing portion P2 is covered with a second cover 27. The first inverter 30 and the second inverter 40, together with the case 2 of the drive device 1, are disposed in the driving force source room Q (refer to FIG. 1).

2. Schematic Structure of Inverter Device

The inverter device 3 performs conversion between direct-current power and alternating-current power. The inverter device 3 includes the first inverter 30 connected between the electric storage device B and the rotary electric machine MG, and performing the power conversion between a direct current and an alternating current, and also includes the second inverter 40 connected between the electric storage device B and the pump motor PM, and performing the power conversion between a direct current and an alternating current. In the present embodiment, the first inverter 30 and the second inverter 40 share the electric storage device B, and also share the capacitor C for smoothing the direct-current power (reducing fluctuations in the direct-current power). Each of the rotary electric machine MG and the pump motor PM is structured as a rotary electric machine driven by a multi-phase alternating current (three-phase alternating current, in the present example), being structured to pass currents of three phases (U-phase, V-phase, and W-phase).

Figure 3:
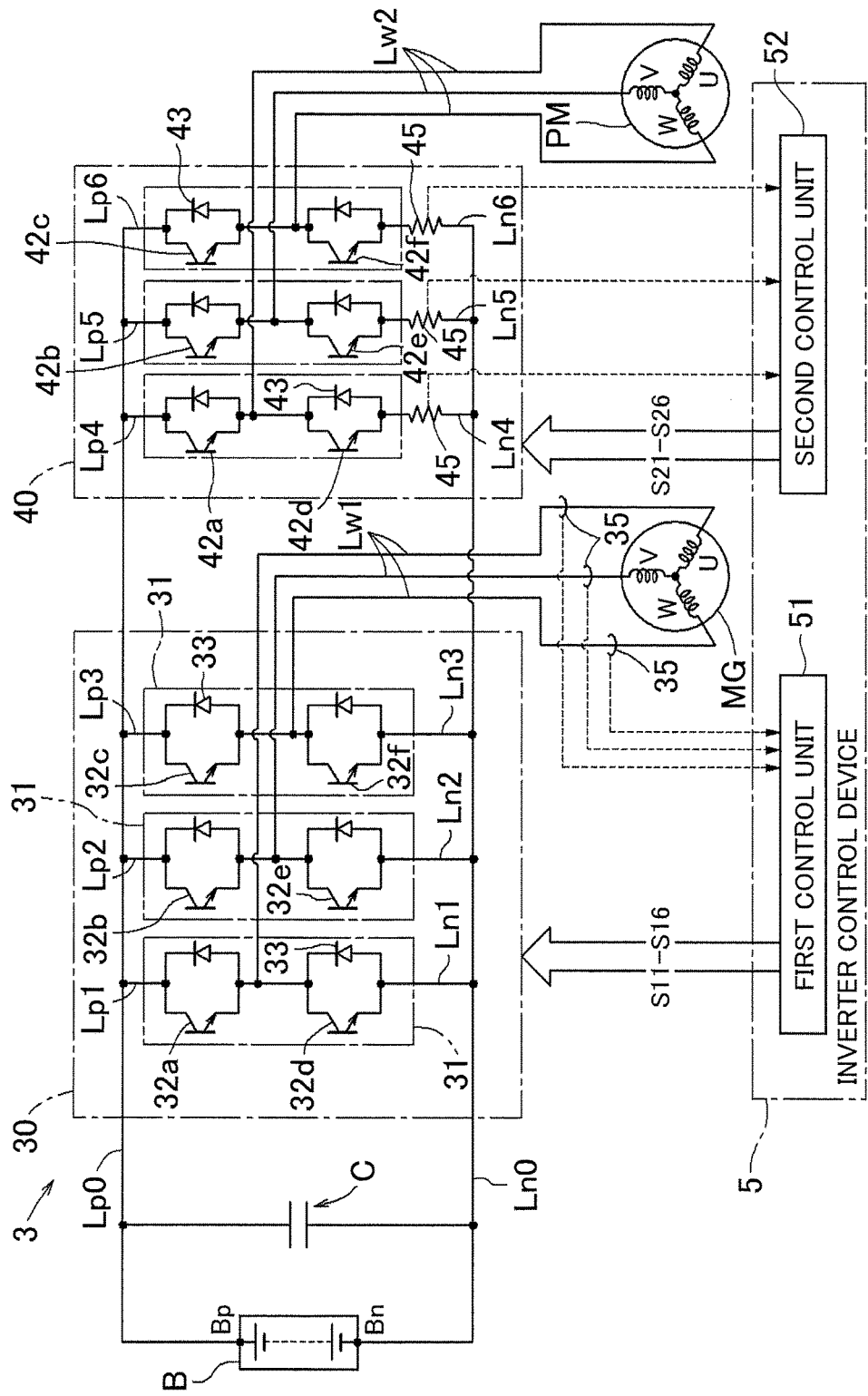
FIG. 3 is a circuit diagram of an inverter device.

As shown in FIG. 3, the capacitor C is connected between a positive electrode Bp side and a negative electrode Bn side (for example, the ground side) of the electric storage device B serving as a direct-current power supply, through a pair of common positive line Lp0 and common negative line Ln0. Switching element units 31 for the respective phases constituting the first inverter 30 are connected in parallel with one another between the common positive line Lp0 and the common negative line Ln0. Specifically, the switching element units 31 are respectively connected between three positive branch lines Lp1 to Lp3 branching from the common positive line Lp0 and three negative branch lines Ln1 to Ln3 branching from the common negative line Ln0. In the present embodiment, the switching element units 31 correspond to "first switching element units" in the present disclosure. The switching element units 31 correspond to the three respective phases (U-phase, V-phase, and W-phase) of stator coils of the rotary electric machine MG (stator St).

Each of the switching element units 31 includes an upper switching element 32 provided on the positive electrode Bp side of the electric storage device B with respect to a connection part of the switching element unit 31 and the rotary electric machine MG, and also includes a lower switching element 32 provided on the negative electrode Bn side of the electric storage device B with respect to the aforementioned connection part. In other words, the first inverter 30 includes upper switching elements 32a to 32c, each connected to the common positive line Lp0, and lower switching elements 32d to 32f, each connected to the common negative line Ln0. A set of two parallel-connected switching elements 32 may be used instead of the switching elements 32 in the example of FIG. 3. While the present example uses an insulated gate bipolar transistor (IGBT) as the switching element 32, for example, a metal-oxide-semiconductor field-effect transistor (MOSFET) may be used as the switching element 32.

The collectors of the upper switching elements 32a, 32b, and 32c of the respective phases are connected to the positive electrode Bp of the electric storage device B through the common positive line Lp0. The emitters of the upper switching elements 32a, 32b, and 32c of the respective phases are connected to the collectors of the lower switching elements 32d, 32e, and 32f, respectively. The emitters of the lower switching elements 32d, 32e, and 32f are connected to the negative electrode Bn of the electric storage device B through the common negative line Ln0. A rectifying device 33 is connected between the emitter and the collector of each of the switching elements 32 in parallel therewith. A diode is used as the rectifying device 33. A first control unit 51 of an inverter control device 5 (to be described later) individually controls switching of the gate of each of the switching element 32.

The switching element units 31 are connected to the rotary electric machine MG through first wiring members Lw1 for the respective phases. The pair of switching elements 32 for each of the phases are connected at a midpoint thereof (between the emitter of the upper switching element and the collector of the lower switching element) to the stator coil of the corresponding phase of the rotary electric machine MG through corresponding one of the first wiring members Lw1 for the respective phases. In the present embodiment, the first wiring members Lw1 correspond to a "wiring member" in the present disclosure. A current sensor 35 for detecting a current flowing in the stator coil for each phase of the rotary electric machine MG is provided at a predetermined place of corresponding one of the first wiring members Lw1. In the present embodiment, a sensor using a Hall element is used as the current sensor 35 described above. The current sensor 35 includes an annular core surrounding the first wiring member Lw1 and the Hall element disposed in a cutout portion of the core. A current passing through the first wiring member Lw1 for each of the phases generates a magnetic field corresponding to the amount of the current in the core, and causes the Hall element to generate an electromotive force corresponding to the amount of flux. As a result, the current flowing in the stator coil for each phase of the rotary electric machine MG can be detected on the basis of the magnitude of the electromotive force.

As shown in FIG. 3, in the present embodiment, switching element units 41 for the respective phases constituting the second inverter 40 are connected in parallel with one another between the common positive line Lp0 and the common negative line Ln0. Specifically, the switching element units 41 are connected between three positive branch lines Lp4 to Lp6 branching from the common positive line Lp0 and three negative branch lines Ln4 to Ln6 branching from the common negative line Ln0. In the present embodiment, the switching element units 41 correspond to "second switching element units" in the present disclosure. The switching element units 41 correspond to the three respective phases (U-phase, V-phase, and W-phase) of stator coils of the pump motor PM.

Each of the switching element units 41 includes an upper switching element 42 provided on the positive electrode Bp side of the electric storage device B with respect to a connection part of the switching element unit 41 and the pump motor PM, and also includes a lower switching element 42 provided on the negative electrode Bn side of the electric storage device B with respect to the aforementioned connection part. In other words, the second inverter 40 includes upper switching elements 42a to 42c, each connected to the common positive line Lp0, and lower switching elements 42d to 42f, each connected to the common negative line Ln0.

The collectors of the upper switching elements 42a, 42b, and 42c of the respective phases are connected to the positive electrode Bp of the electric storage device B through the common positive line Lp0. The emitters of the upper switching elements 42a, 42b, and 42c of the respective phases are connected to the collectors of the lower switching elements 42d, 42e, and 42f, respectively. The emitters of the lower switching elements 42d, 42e, and 42f of the respective phases are connected to the negative electrode Bn of the electric storage device B through the common negative line Ln0. A rectifying device 43 is connected between the emitter and the collector of each of the switching elements 42 in parallel therewith. A second control unit 52 of the inverter control device 5 (to be described later) individually controls switching of the gate of each of the switching element 42.

The switching element units 41 are connected to the pump motor PM through second wiring members Lw2 for the respective phases. The pair of switching elements 42 for each of the phases are connected at a midpoint thereof (between the emitter of the upper switching element and the collector of the lower switching element) to a stator coil of the corresponding phase of the pump motor PM through corresponding one of the second wiring members Lw2 for the respective phases. In the present embodiment, each of the second wiring members Lw2 is not provided with a current sensor including a Hall element, unlike the first inverter 30.

As a substitute for the current sensor including the Hall element, a shunt resistor 45 is provided between the electric storage device B and each of the switching element units 41 for corresponding one of the phases. In the present embodiment, the shunt resistor 45 is provided in each of the three negative branch lines Ln4 to Ln6, so that a total of three shunt resistors 45 are provided. In the present embodiment, the shunt resistors 45 are mounted on a control board of the second inverter 40. The shunt resistor 45 is provided to detect a current flowing through each of the switching element units 41 (here, the lower switching elements 42d to 420 for the respective phases. A current passing through each of the lower switching elements 42d to 42f generates an electric potential difference between both ends of the shunt resistor 45 corresponding to the amount of the current, thus the current flowing in the stator coil for each phase of the pump motor PM can be detected based on the amount of the electric potential difference and the known resistance value of the shunt resistor 45. Details of the method for detecting the current using the shunt resistor 45 will be described later.

In this way, in the present embodiment, the current sensor 35 using the Hall element detects the current flowing in the stator coil for each phase of the rotary electric machine MG, and the shunt resistor 45 detects the current flowing in the stator coil for each phase of the pump motor PM. The current sensor 35 using the Hall element is expensive, but can always accurately detect the current. By contrast, the shunt resistor 45 is inexpensive, but can detect the current only during a limited time in a control period of the second inverter 40, as will be described later. Specifically, the percentage of the period during which current detection can be performed by the current sensor 35 relative to the control period of the first inverter 30 is higher than the percentage of the period during which current detection can be performed by the shunt resistor 45 relative to the control period of the second inverter 40. In addition, the current sensor 35 using the expensive Hall element has relatively stable temperature characteristics whereas the inexpensive shunt resistor 45 is sensitive to ambient temperature.

The rotary electric machine MG outputs the driving force transmitted to the wheels W. Hence, control accuracy of the rotary electric machine MG needs to be high. The pump motor PM, on the other hand, is used for driving the rotor of the electric pump EP provided independent of the wheels W, so that the control accuracy of the pump motor PM need not be as high as that of the rotary electric machine MG. As a result of comprehensive consideration of these factors, the current sensors 35 including the Hall elements are used for the current detection for the rotary electric machine MG, and the shunt resistors 45 are used for the current detection for the pump motor PM. This configuration can keep the control accuracy of the rotary electric machine MG high, and reduce the product cost while compromising on control accuracy of the pump motor PM to some extent within an allowable range.

The expression "compromising on control accuracy of the pump motor PM to some extent" is an expression made by taking into consideration a comparison with the case in which the current is detected using the current sensors including the Hall elements in the same way as in the case of the rotary electric machine MG. By employing the structure to use the second inverter 40 to control the pump motor PM for driving the rotor of the electric pump EP, the state of the transmission device TM can be controlled with relatively high accuracy compared with the case of driving the pump motor PM, for example, at constant torque or at a constant rotational speed. The structure of the present embodiment can reduce the product cost by using the inexpensive shunt resistors 45 to detect the current while allowing the state of the transmission device TM to be relatively accurately controlled by inverter control of the pump motor PM. The structure of the present embodiment can also comprehensively reduce the influence of the product cost reduction on the control accuracy of the rotary electric machine MG and the pump motor PM. Moreover, mounting the shunt resistors 45 on the control board of the second inverter 40 can effectively downsize the second inverter 40, and thus the entire device.

In particular, in the structure in which the shunt resistors 45 embedded in the second inverter 40 are arranged in the driving force source room Q, the internal combustion engine E and the rotary electric machine MG as the driving force sources of the wheels W generate heat while the vehicle is running, so that a situation is likely to occur in which the temperature of the installation environment of the shunt resistors 45 rises to a high temperature. An increase in the amount of fluctuation in the ambient temperature reduces the current detection accuracy obtained by the shunt resistors 45, and, as a result, is likely to reduce the control accuracy of the pump motor PM. Even in this case, the allowable range of accuracy required for controlling the pump motor PM can absorb the reduction in the control accuracy. Specifically, even in the case in which the shunt resistors 45 are disposed in the driving force source room Q and placed under the high-temperature environment, the influence on the control accuracy of the rotary electric machine MG and the pump motor PM can be reduced comprehensively.

3. Structure of Inverter Control Device

As shown in FIG. 3, the inverter control device 5 includes the first control unit 51 and the second control unit 52. The first control unit 51 individually controls switching of the switching elements 32 of the first inverter 30 to control drive of the rotary electric machine MG. The second control unit 52 individually controls switching of the switching elements 42 of the second inverter 40 to control drive of the pump motor PM. In the present embodiment, both the first control unit 51 and the second control unit 52 control the drive of the rotary electric machine MG and the pump motor PM, respectively, based on a current vector control method.

Figure 4:
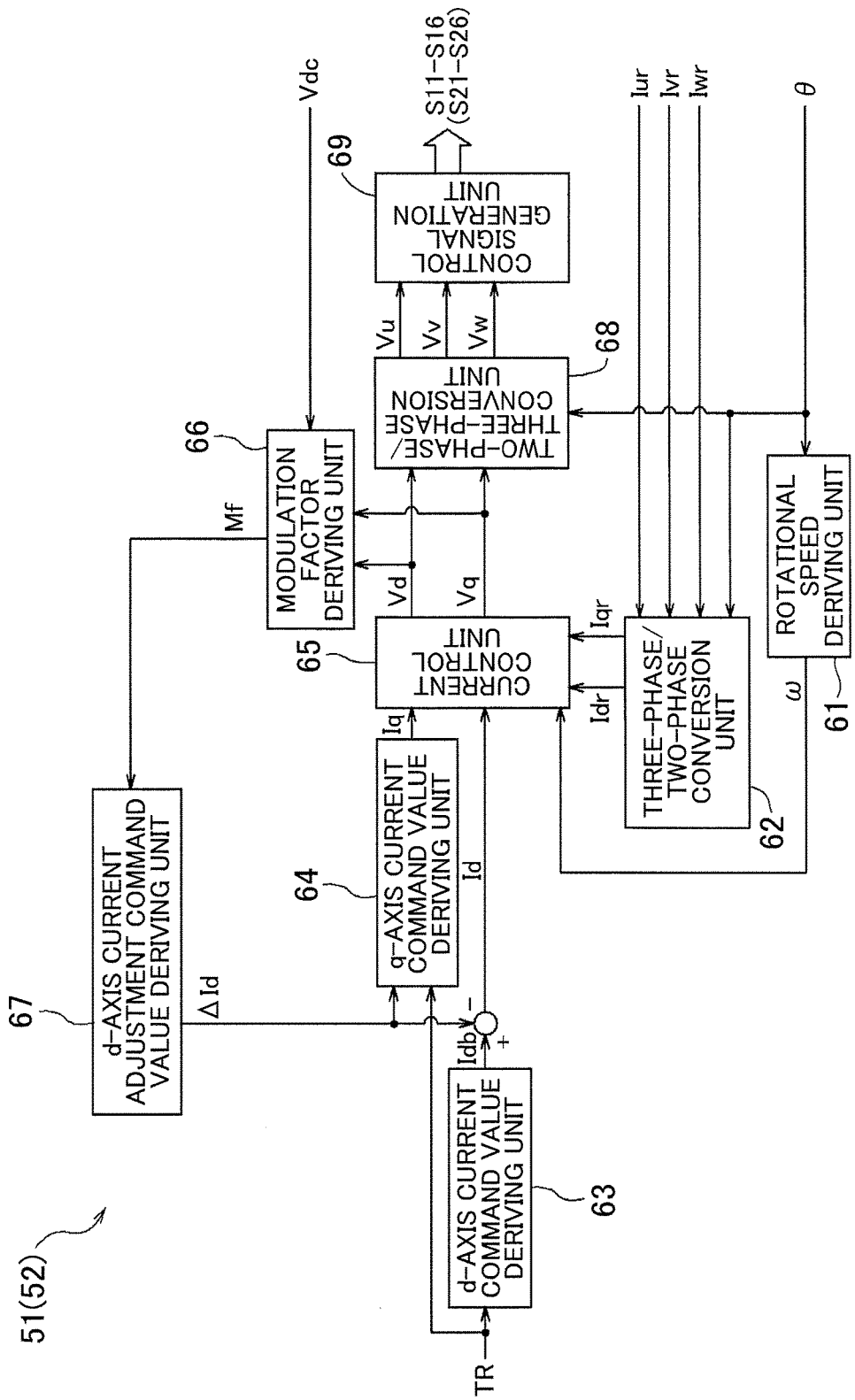
FIG. 4 is a block diagram of an inverter control device.

As shown in FIG. 4, the first control unit 51 includes a rotational speed deriving unit 61, a three-phase/two-phase conversion unit 62, a d-axis current command value deriving unit 63, a q-axis current command value deriving unit 64, a current control unit 65, a modulation factor deriving unit 66, a d-axis current adjustment command value deriving unit 67, a two-phase/three-phase conversion unit 68, and a control signal generation unit 69. The first control unit 51 receives a U-phase current Iur, a V-phase current Ivr, and a W-phase current Iwr detected by the current sensors 35 (refer to FIG. 3), a magnetic pole position θ of the rotor Ro in the rotary electric machine MG, and a direct-current voltage Vdc that is a voltage on the direct-current side of the first inverter 30. The first control unit 51 also receives target torque TR.

The rotational speed deriving unit 61 derives a rotational speed ω of the rotary electric machine MG based on the magnetic pole position θ. The derived rotational speed ω is provided to the current control unit 65 and the two-phase/three-phase conversion unit 68. The three-phase/two-phase conversion unit 62 derives a d-axis current Idr and a q-axis current Iqr based on the U-phase current Iur, the V-phase current Ivr, and the W-phase current Iwr, and the magnetic pole position θ. The derived d-axis and q-axis currents Idr and Iqr are provided to the current control unit 65.

The d-axis current command value deriving unit 63 derives a basic d-axis current command value Idb based on the target torque TR. The basic d-axis current command value Idb corresponds to a command value for a d-axis current when maximum torque control is performed. The maximum torque control is a control to adjust a current phase so as to maximize output torque of the rotary electric machine MG for the same current. In the present embodiment, the d-axis current command value deriving unit 63 uses a predetermined map to derive the basic d-axis current command value Idb corresponding to the value of the target torque TR. A d-axis current adjustment command value ΔId is derived by the d-axis current adjustment command value deriving unit 67 (to be described later) and subtracted from the basic d-axis current command value Idb to obtain a d-axis current command value Id, which is provided to the current control unit 65.

The q-axis current command value deriving unit 64 derives a q-axis current command value Iq based on the target torque TR. In the present embodiment, the q-axis current command value deriving unit 64 uses a predetermined map to derive the q-axis current command value Iq corresponding to the value of the target torque TR. If the d-axis current adjustment command value deriving unit 67 (to be described later) has derived the d-axis current adjustment command value ΔId, the q-axis current command value deriving unit 64 derives the q-axis current command value Iq in accordance with the values of the target torque TR and the d-axis current adjustment command value ΔId. The derived q-axis current command value Iq is provided to the current control unit 65.

The current control unit 65 determines a d-axis voltage command value Vd and a q-axis voltage command value Vq based on the d-axis current command value Id and the q-axis current command value Iq, the d-axis current Idr and the q-axis current Iqr, and the rotational speed ω. The current control unit 65 performs current feedback control with respect to the d-axis current command value Id and the q-axis current command value Iq to determine the d-axis voltage command value Vd and the q-axis voltage command value Vq. The determined d-axis and q-axis voltage command values Vd and Vq are provided to the modulation factor deriving unit 66 and the two-phase/three-phase conversion unit 68.

The modulation factor deriving unit 66 derives a modulation factor Mf based on the d-axis voltage command value Vd and the q-axis voltage command value q, and the direct-current voltage Vdc. The modulation factor deriving unit 66 derives the modulation factor Mf by Expression (1) below.

$$Mf = \sqrt{(Vd^2 + Vq^2)}/Vdc \quad (1)$$

The modulation factor Mf serves as an indicator representing a ratio of the effective value of the fundamental wave component in an output voltage waveform from the first inverter 30 to the direct-current voltage Vdc. The derived modulation factor Mf is provided to the d-axis current adjustment command value deriving unit 67.

The d-axis current adjustment command value deriving unit 67 derives the d-axis current adjustment command value ΔId based on the modulation factor Mf and a predetermined reference modulation factor (for example, 0.78). If the modulation factor Mf exceeds the reference modulation factor, the d-axis current adjustment command value deriving unit 67 derives the d-axis current adjustment command value ΔId (ΔId>0) based on the deviation of the modulation factor Mf from the reference modulation factor.

The d-axis current adjustment command value ΔId is a command value for giving a field-weakening current, which works to weaken the magnetic field flux of the rotor Ro in the rotary electric machine MG. Specifically, after the d-axis current adjustment command value ΔId is derived, field-weakening control is performed to adjust phases of alternating-current voltage commands so that the magnetic field produced by the stator coil of the rotary electric machine MG changes so as to weaken the magnetic field flux of the rotor Ro. The d-axis current adjustment command value ΔId is provided to the q-axis current command value deriving unit 64. The d-axis current adjustment command value ΔId is subtracted from the basic d-axis current command value Idb derived by the d-axis current command value deriving unit 63 to obtain the d-axis current command value Id, which in turn is provided to the current control unit 65.

The two-phase/three-phase conversion unit 68 derives a U-phase voltage command value Vu, a V-phase voltage command value Vv, and a W-phase voltage command value Vw as the alternating-current voltage commands based on the d-axis voltage command value Vd and the q-axis voltage command value Vq, and the magnetic pole position θ. The derived three-phase alternating-current voltage command values Vu, Vv, and Vw are provided to the control signal generation unit 69.

The control signal generation unit 69 generates control signals (switching control signals) S11 to S16 for individually controlling the switching of the switching elements 32a to 32f of the first inverter 30 based on the U-phase voltage command value Vu, the V-phase voltage command value Vv, and the W-phase voltage command value Vw. The control signal generation unit 69 generates the control signals S11 to S16 for at least pulse-width modulation (PWM) control. The control signal generation unit 69 generates the control signals S11 to S16 for the PWM control based on a comparison in magnitude between the carrier (carrier wave) and the alternating-current voltage command values Vu, Vv, and Vw. The carrier is formed, for example, of a triangular wave or a sawtooth wave. The control signal generation unit 69 may be structured to generate the control signals S11 to S16 for known overmodulation PWM control or rectangular wave control, depending on, for example, the magnitude of the modulation factor Mf.

The second control unit 52 has basically the same structure as that of the first control unit 51 although the pump motor PM serves as a controlled object of the second control unit 52 whereas the rotary electric machine MG serves as a controlled object of the first control unit 51. However, the d-axis current adjustment command value deriving unit 67 in the second control unit 52 derives the d-axis current adjustment command value ΔId under a "specified condition" even if the modulation factor Mf is not larger than the reference modulation factor. In this way, the second control unit 52 is structured to perform the field-weakening control even when the "specified condition" is satisfied, regardless of the magnitude of the modulation factor Mf. This feature will be described later. The control signal generation unit 69 in the second control unit 52 is structured to generate control signals S21 to S26 dedicated for the PWM control. The other features are the same as those of the first control unit 51, so that the details thereof will not be described here.

4. Method for Detecting Current Using Shunt Resistors

Figure 5:
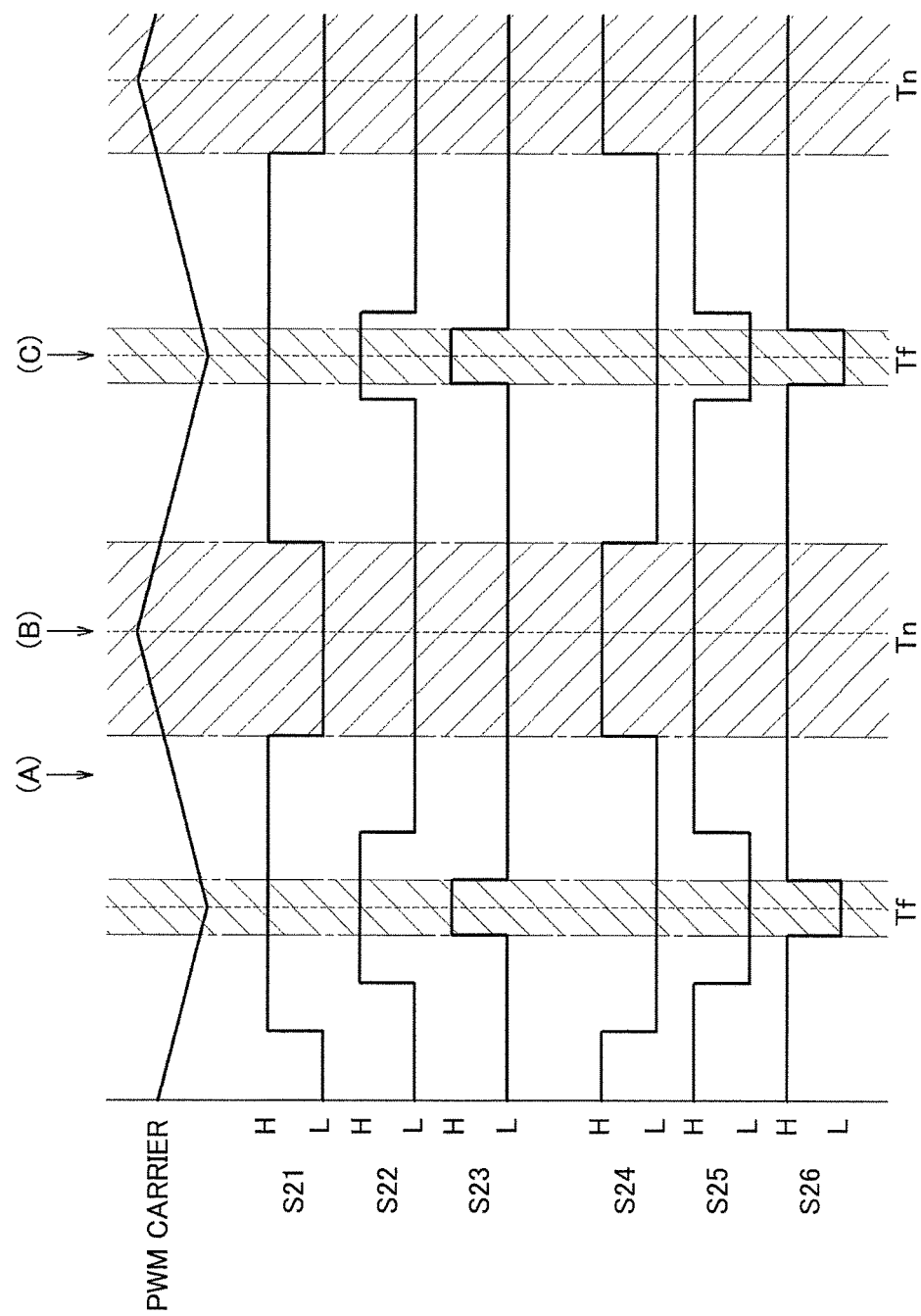
FIG. 5 is a schematic diagram showing an example of control signals.

As described above, the second control unit 52 generates the control signals S21 to S26 for the PWM control, and individually controls the switching elements 42 based on the control signals S21 to S26 to control the pump motor PM by the PWM control. In the present embodiment, the PWM control means a continuous pulse-width modulation (CPWM), such as a sinusoidal PWM or a space vector PWM. As is well known, the PWM control modulates the alternating-current voltage command values Vu, Vv, and Vw into discrete pulse signals. FIG. 5 schematically shows enlarged waveforms of the control signals S21 to S26 together with the carrier, in a predetermined period.

As shown in FIG. 5, the control signal S21 is at a high (H) level when the U-phase voltage command value Vu is not lower than the carrier, and is at a low (L) level when the U-phase voltage command value Vu is lower than the carrier. The upper switching element 42a for the U-phase is ON when the control signal S21 is at the high (H) level, and is OFF when the control signal S21 is at the low (L) level. The control signals S22 and S23 are also generated based on the comparison of the voltage command values Vv and Vw with the carrier, and the upper switching element 42b for the V-phase and the upper switching element 42c for the W-phase are also switched between ON and OFF in the same way.

The levels of the control signals S24 to S26 at each time are opposite to the levels of the control signals S21 to S23, respectively. The control signal S24 is at the low (L) level while the control signal S21 is at the high (H) level, and the control signal S24 is at the high (H) level while the control signal S21 is at the low (L) level. The same applies to the relation between the control signal S22 and the control signal S25, and the relation between the control signal S23 and the control signal S26. As a result, the upper switching elements 42a to 42c for the respective phases and the lower switching elements 42d to 42f, respectively, for the corresponding phases are switched in a complementary manner. In practice, a dead time exists in which two upper and lower switching elements 42 included in each of the switching element units 41 are both OFF. The dead time is, however, omitted from the description for simplicity.

Attention to mutual relations among the three-phase control signals S21 to S23 (or control signals S24 to S26) reveals that a period is present in which the three-phase control signals are at mixed levels of the high (H) and the low (L) levels, and another period is present in which the three-phase control signals are at the same level. In this description, the former is called an "active vector period", and the latter is called a "zero vector period". FIG. 5 shows the zero vector period with hatching.

Figure 6:
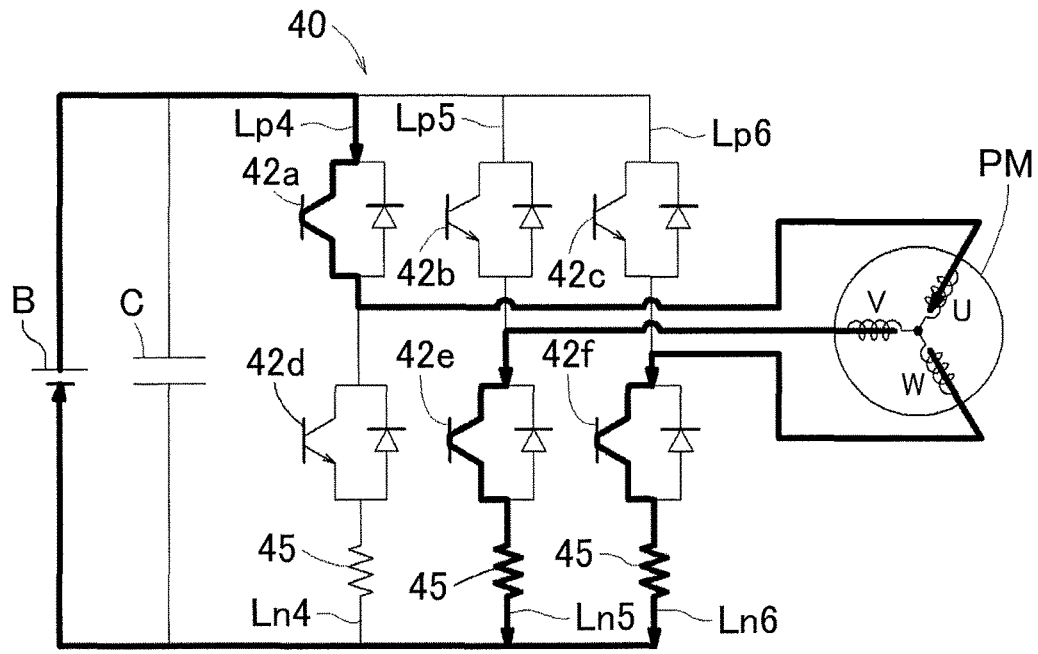
FIG. 6 is a schematic diagram showing an example of a flow of a current during an active vector period.

As an example of the active vector period, at a time, for example, indicated as (A) in FIG. 5, the upper switching element 42a for the U-phase is ON, and the upper switching elements 42b and 42c for the V-phase and the W-phase are OFF. At this time, the electric storage device B (capacitor C) is conducted to the pump motor PM via the second inverter 40, and the current flows therethrough (refer to FIG. 6). Specifically, the current flows through a path from the positive electrode Bp side of the electric storage device B (capacitor C), via, sequentially, the upper switching element 42a for the U-phase, the pump motor PM, and the lower switching elements 42e and 42f for the V-phase and the W-phase, then to the negative electrode Bn side of the electric storage device B (capacitor C).

In this case, the currents of the V-phase and the W-phase flow in two of the shunt resistors 45 provided in the negative branch lines Ln5 and Ln6, so that the currents flowing in the stator coils of the V-phase and the W-phase can be detected. The current of the U-phase flows in the positive branch line Lp4, and does not flow in the shunt resistor 45 provided in the negative branch line Ln4. Therefore, the current flowing in the stator coil of the U-phase cannot be detected. Also, in other active vector periods, the current or currents flowing in the stator coil or stator coils of one phase or two phases can be detected in the same way in accordance with the pattern of the path conducting the current or currents.

The zero vector period includes a period in which all the upper switching elements 42a to 42c for the three phases are ON and a period in which all the upper switching elements 42a to 42c are OFF. In other words, the zero vector period includes a period in which all the lower switching elements 42d to 42f for the three phases are OFF and a period in which all the lower switching elements 42d to 42f are ON. In this description, the former is called a "lower full-off period Tf", and the latter is called a "lower full-on period Tn". The lower full-off period Tf is a period in which all the switching elements 42 on the side provided with the shunt resistors 45 are OFF, and can also be called a "target full-off period". In the same sense, the lower full-on period Tn can be called a "target full-on period". No current flows between the electric storage device B and the pump motor PM during the zero vector period. During the zero vector period, however, currents circulate between the second inverter 40 and the pump motor PM. The circulation pattern of the currents differs between the lower full-on period Tn and the lower full-off period Tf.

Figure 7:
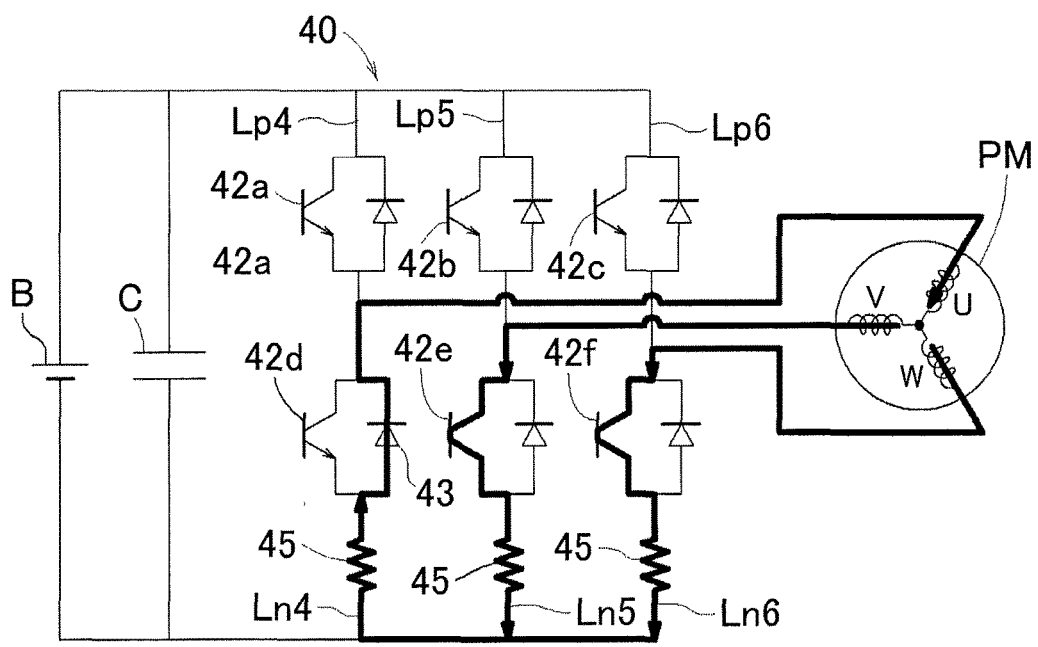
FIG. 7 is a schematic diagram showing the flow of the current during a lower full-on period.

At a time during the lower full-on period Tn indicated, for example, as (B) in FIG. 5, all the lower switching elements 42d to 42f for the three phases are ON. At this time, the currents circulate through the lower switching elements 42d to 42f (or the corresponding rectifying devices 43) for the three phases (refer to FIG. 7). Specifically, the currents circulate in a closed circuit from the pump motor PM, via, sequentially, the lower switching elements 42e and 42f for the V-phase and the W-phase and the rectifying device 43 connected in parallel with the lower switching element 42d for the U-phase, then back to the pump motor PM.

In this case, the currents flow through all the three shunt resistors 45 provided in the negative branch lines Ln4 to Ln6. The inverter control device 5 (second control unit 52) utilizes this phenomenon to perform the current detection process using the shunt resistors 45 during the lower full-on period Tn. In other words, the inverter control device 5 simultaneously detects the currents flowing in the stator coils of the respective phases of the pump motor PM during the lower full-on period Tn. As described above, each of the currents flowing in the stator coils of the respective phases of the pump motor PM is detected based on the electric potential difference between both ends of the corresponding shunt resistor 45.

Figure 8:
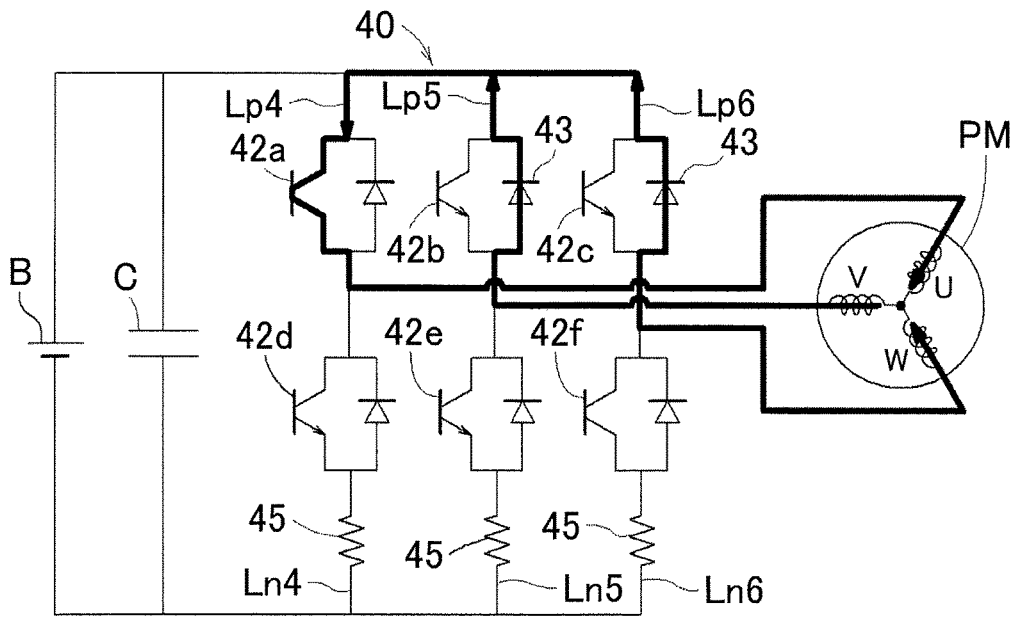
FIG. 8 is a schematic diagram showing the flow of the current during a lower full-off period.

At a time during the lower full-off period Tf indicated, for example, as (C) in FIG. 5, all the lower switching elements 42d to 42f for the three phases are OFF (all the upper switching elements 42a to 42c for the three phases are ON). At this time, the currents circulate through the upper switching elements 42a to 42c (or the corresponding rectifying devices 43) for the three phases (refer to FIG. 8). Specifically, the currents circulate in a closed circuit from the pump motor PM, via, sequentially, the rectifying devices 43 respectively connected in parallel with the upper switching elements 42b and 42c for the V-phase and the W-phase and the upper switching element 42a for the U-phase, then back to the pump motor PM.

In this case, theoretically, no current flows in any of the three shunt resistors 45 provided in the negative branch lines Ln4 to Ln6. In practice, however, the three shunt resistors 45 detect small currents during the lower full-off period Tf. These small currents cause an error in the zero point (origin) in the current detection process performed during the lower full-on period Tn. To solve this problem, the inverter control device 5 uses the shunt resistors 45 to detect the small currents flowing in the stator coils of the respective phases of the pump motor PM during the lower full-off period Tf. In other words, the inverter control device 5 simultaneously detects the small currents flowing in the stator coils of the respective phases of the pump motor PM during the lower full-off period Tf. The inverter control device 5 uses the small currents of the respective phases detected during the lower full-off period Tf in this way to calculate an offset correction amount ΔOc at the zero point in the current detection process described above.

A study conducted by the inventors of the present disclosure has found that the amounts of the currents detected by the shunt resistors 45 during the lower full-off period Tf are not uniform, but the amounts of the currents flowing in the stator coils of the respective phases of the pump motor PM are correlated with one another. In view of this point, in the present embodiment, the inverter control device 5 divides an electrical angle period Tc of the pump motor PM into a plurality of divided periods Td, and individually determines the offset correction amount ΔOc for each of the divided periods Td. More specifically, the inverter control device 5 stores (accumulates) the individual offset correction amount previously determined for each of the divided periods Td. Then, based on the accumulated offset correction amounts, the inverter control device 5 determines the offset correction amount ΔOc as a value obtained by statistically processing (for example, by calculating the average value, a weighted average value, the mode value, or the median value, over a specified time period, of) the accumulated offset correction amounts. The offset correction amount ΔOc for each of the divided periods Td is determined for each of the shunt resistors 45. The number of the divided periods Td may be set to an appropriate value, but is preferably set to $2^K$ (K represents a natural number of 10 or less).

Figure 9:
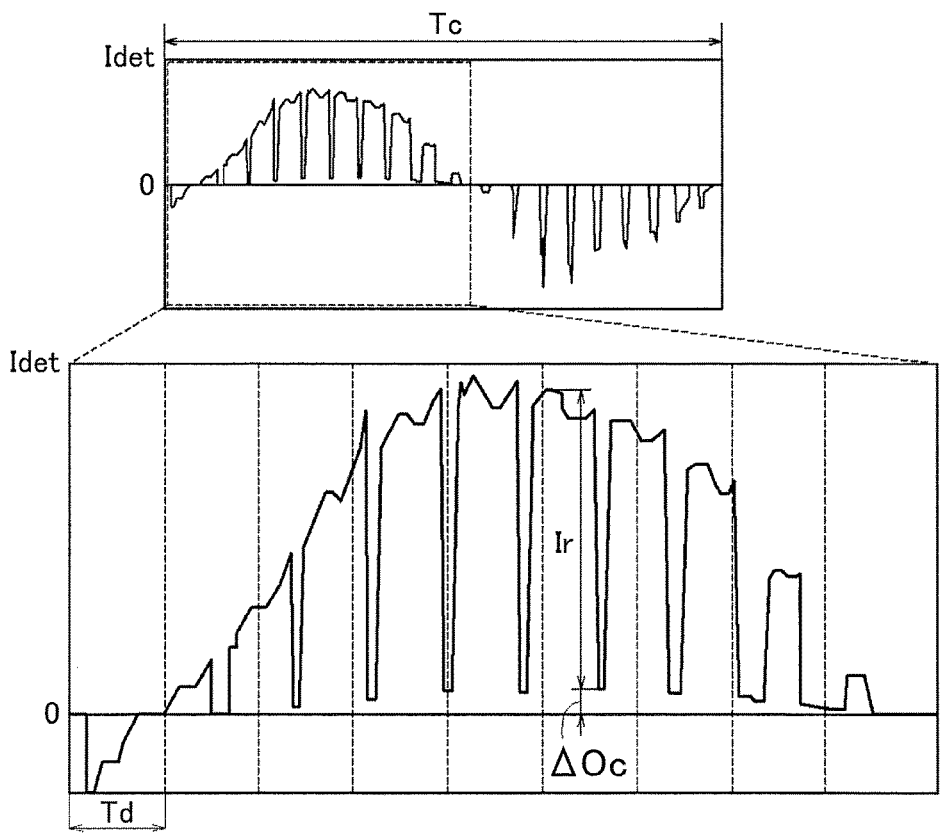
FIG. 9 is a waveform diagram showing a detection method of an actual current flowing in a stator coil.

The inverter control device 5 uses the offset correction amount ΔOc determined as described above to detect an actual current flowing in each of the stator coils of the respective phases of the pump motor PM. The inverter control device 5 detects, for each phase, the actual current ("Ir" shown in FIG. 9) flowing in the stator coil, by using the offset correction amount ΔOc to correct a current detection value ("Idet" shown in FIG. 9) obtained by the current detection process executed during the lower full-on period Tn. Specifically, the inverter control device 5 detects, for each phase, the actual current (Ir) flowing in the stator coil by subtracting the offset correction amount ΔOc assigned to one of the divided periods Td corresponding thereto from the actually obtained current detection value (Idet). The detected actual current values of the respective phases are provided, as the U-phase current Iur, the V-phase current Ivr, and the W-phase current Iwr (refer to FIG. 4), for the current feedback control performed by the second control unit 52.

As described above, in the present embodiment, the shunt resistors 45 embedded in the second inverter 40 are disposed in the driving force source room Q, so that the periphery of the shunt resistors 45 is likely to be heated to a high temperature, and the amount of fluctuation in the temperature is likely to increase. The increase in the amount of fluctuation in the ambient temperature reduces the current detection accuracy obtained by the shunt resistors 45, and, as a result, is likely to reduce the control accuracy of the pump motor PM. A technique is known in which the offset at the zero point is corrected when the device starts up. However, the technique alone is not sufficient to deal with the large fluctuation in the ambient temperature, which is a problem. In this respect, in the present embodiment, the offset correction amount ΔOc is determined during the lower full-off period Tf repeatedly appearing during the drive control of the pump motor PM, so that the offset can be repeatedly corrected, and hence, the fluctuation in the ambient temperature can be dealt with. As a result, the detection accuracy in the current detection process can be increased.

In the present embodiment, the electric potential difference is actually sampled at the middle (intermediate time) of the lower full-on period Tn in the current detection process. The electric potential difference between both ends of each of the shunt resistors 45 is very small, so that an operational amplifier (not shown) amplifies output signals from the shunt resistors 45 during the sampling. In other words, the second control unit 52 includes the amplifying circuit for amplifying the output signals from the shunt resistors 45. However, a general-purpose operational amplifier has a slew rate that is set to a relatively small value, and hence, the maximum response speed thereof is limited. Specifically, the temporal change rate of the output values from the shunt resistors 45 has an upper limit given by the slew rate (change rate limit value) set in advance for the operational amplifier.

FIG. 10 schematically shows examples of modes of change in one of the output signals from the shunt resistors 45 obtained through the operational amplifier during the lower full-on period Tn. As can be understood from the upper diagram of FIG. 10, in a situation of, for example, increasing the output torque of the pump motor PM, if the lower full-on period Tn is fairly short, the electric potential difference sampling may be performed while the output signal from the shunt resistor 45 has not been fully amplified. In such a case, the current flowing in each of the stator coils of the respective phases of the pump motor PM is falsely detected (detected as a value different from an actual value), so that the control accuracy of the pump motor PM is reduced. For example, if a value smaller than the actual current is provided for the current feedback control as the current detection value, a large force acts to eliminate a current deviation calculated to be larger than an actual value. As a result, the current flowing in the stator coil may increase to an unnecessarily large value.

To solve this problem, in the present embodiment, if the lower full-on period Tn is shorter than a predetermined reference time Tr, the inverter control device 5 performs an adjusting process to adjust parameters for the current feedback control of the pump motor PM so as to increase the lower full-on period Tn. The reference time Tr is set based on the change rate limit value (slew rate) set in advance for the operational amplifier as the upper limit value of the temporal change rate of the output values from the shunt resistors 45. The reference time Tr is preferably set, based on an expected maximum value of the output values from the shunt resistors 45, to a time twice or more a time obtained by dividing the maximum value by the change rate limit value. Examples of the parameters to be adjusted include, but are not limited to, the carrier frequency in the PWM control and the modulation factor Mf in the current vector control. These parameters may be adjusted in an alternative manner or in a combined manner.

The present embodiment is structured such that the carrier frequency in the PWM control is continuously changeable. As an embodiment of the adjusting process, if the lower full-on period Tn is shorter than the reference time Tr, the inverter control device 5 reduces the carrier frequency in the PWM control (refer to the lower diagram of FIG. 10). The control signals S21 to S26 are generated based on a comparison in magnitude between the carrier and the alternating-current voltage command values Vu, Vv, and Vw. Hence, reducing the carrier frequency (increasing the carrier period) increases the duration time of the ON state of each of the lower switching elements 42d to 42f for the respective phases. Moreover, the duration time of the ON state of each of the lower switching elements 42d to 42f for the respective phases can be increased while keeping a duty ratio constant. As a result, the lower full-on period Tn can be increased.

In the present embodiment, the inverter control device 5 reduces the carrier frequency to a frequency at which the lower full-on period Tn is equal to the reference time Tr. This configuration can ensure the reference time Tr as the lower full-on period Tn, and hence, can restrain the sampling of the output signal from the shunt resistor 45 that has not been fully amplified due to the slew rate of the operational amplifier. As a result, correctness of the current detection process can be ensured. In that case, the amount of reduction in the carrier frequency can be minimized to a necessary level. As a result, for example, degradation in controllability and generation of noise of the pump motor PM can be effectively reduced.

Figure 11:
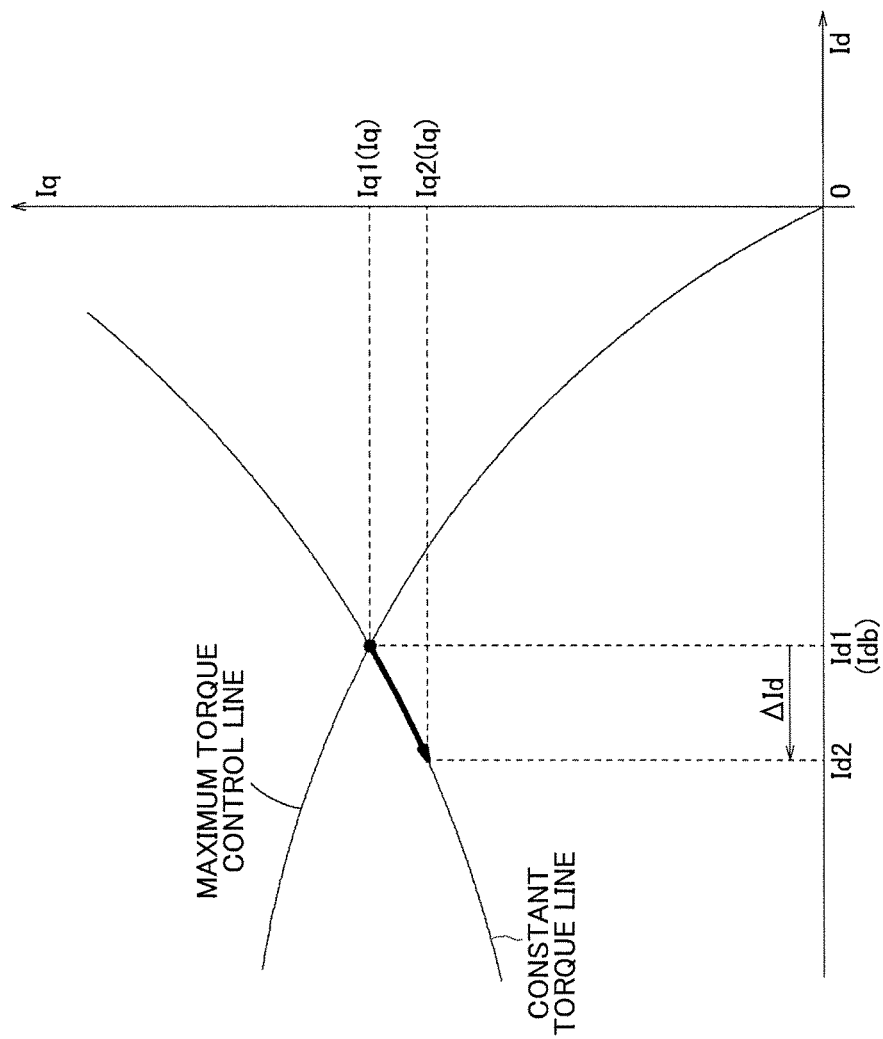
FIG. 11 is a diagram showing a change in a current command value by field-weakening control.

As another embodiment of the adjusting process, if the lower full-on period Tn is shorter than the reference time Tr, the inverter control device 5 reduces the modulation factor Mf in the current vector control. The inverter control device 5 performs the field-weakening control to reduce the modulation factor Mf. In the present embodiment, the phenomenon that "the lower full-on period Tn is shorter than the reference time Tr" corresponds to the "specified condition" mentioned above as one of the conditions to start the field-weakening control. After the field-weakening control is performed and the d-axis current adjustment command value ΔId is derived, d-axis current command value Id decreases (changes in the negative direction), as clearly seen from FIG. 4. In general, the q-axis current command value Iq derived based on the predetermined map also decreases along a constant torque line, as shown in FIG. 11. As a result, the current deviation in the current feedback control decreases, and the voltage command values Vd and Vq derived by the current control unit 65 also decreases. Consequently, the execution of the field-weakening control reduces the modulation factor Mf, as clearly understood from Expression (1) given above.

The modulation factor Mf is an indicator representing a ratio of the effective value of the fundamental wave component in an output voltage waveform from the second inverter 40 to the direct-current voltage Vdc, and therefore, reducing the modulation factor Mf reduces the duty ratio. Reducing the duty ratio reduces the duration time of the ON state of each of the upper switching elements 42a to 42c for the respective phases, and increases the duration time of the ON state of each of the lower switching elements 42d to 42f for the respective phases by an amount corresponding to the reduction in the duration time. As a result, the lower full-on period Tn can be increased.

The inverter control device 5 reduces the modulation factor Mf so that the lower full-on period Tn is not shorter than the reference time Tr. To achieve this, for example, it is recommended to experimentally determine in advance a second reference modulation factor that increases the lower full-on period Tn to be not shorter than the reference time Tr. The d-axis current adjustment command value deriving unit 67 is preferably structured to derive the d-axis current adjustment command value ΔId based on the second reference modulation factor (for example, a value roughly in the range from 0.6 to 0.7) obtained as an empirical value and the modulation factor Mf. This structure can also ensure the reference time Tr as the lower full-on period Tn, and hence, can restrain the sampling of the output signal from the shunt resistor 45 that has not been fully amplified due to the slew rate of the operational amplifier. As a result, correctness of the current detection process can be ensured. In that case, the output torque of the pump motor PM can be kept constant.

5. Other Embodiments

Finally, other embodiments of the drive device according to the present disclosure will be described. Any structure disclosed in each of the following embodiments can be applied in combination with structures disclosed in other embodiments unless any contradiction occurs.

(1) The embodiment above has been described by exemplifying the structure (three-shunt structure) in which the shunt resistor 45 is provided in each of the three negative branch lines Ln4 to Ln6. The embodiments of the present disclosure are, however, not limited to this structure. For example, the structure may be a structure (two-shunt structure) in which the shunt resistor 45 is provided in each of any two of the three negative branch lines Ln4 to Ln6. The sum of instantaneous values of currents of the respective phases is zero, so that this structure also allows appropriate detection of the currents flowing in the stator coils of the respective phases of the pump motor PM. Alternatively, the structure may be a structure (one-shunt structure) in which one shunt resistor 45 is provided in the common negative line Ln0.

(2) The embodiment above has been described by exemplifying the structure in which the shunt resistors 45 are provided in the negative branch lines Ln4 to Ln6 so as to detect the currents flowing in the respective lower switching elements 42*d* to 42*f* for the corresponding phases. The embodiments of the present disclosure are, however, not limited to this structure. For example, the shunt resistors 45 may be provided in the positive branch lines Lp4 to Lp6 or in the common positive line Lp0 so as to detect the currents flowing in the respective upper switching elements 42*a* to 42*c* for the corresponding phases. However, this case requires installation of another circuit for generating a reference electric potential.

(3) The embodiment above has been described by way of the example in which the sensor including the core and the Hall element is used as the current sensor 35 for detecting the current flowing in the stator coil for each phase of the rotary electric machine MG. The embodiments of the present disclosure are, however, not limited to this structure. Any other sensor may be used provided that the percentage of the period during which current detection can be performed by the sensor relative to the control period of the first inverter 30 is higher than the percentage of the period during which current detection can be performed by the shunt resistor 45 relative to the control period of the second inverter 40. For example, a coreless current sensor using a Hall element, a current sensor using a magnetic coil, or a current sensor using a coreless coil may be used.

(4) The embodiment above has been described by exemplifying the structure in which the second inverter 40 controls the pump motor PM drivingly connected to the rotor of the oil discharging electric pump EP provided independent of the wheels W. The embodiments of the present disclosure are, however, not limited to this structure. For example, the second inverter 40 may be structured to control an alternating-current rotary electric machine drivingly connected to a rotating body other than the rotor of the electric pump EP. Examples of such a rotating body include, but are not limited to, rotors of a drive motor for cooling water discharge, a drive motor for an air conditioner compressor, a drive motor for an electric power steering, and a drive motor for a cooling fan.

(5) The embodiment above has been described by exemplifying the inverter-caseless structure in which the first inverter 30 and the second inverter 40 are integrally fixed to the case 2. The embodiments of the present disclosure are, however, not limited to this structure. For example, the first inverter 30 and the second inverter 40 may be accommodated in the dedicated inverter case separate from the case 2, and the dedicated inverter case and the case 2 may be disposed in the driving force source room Q. In this case, the inverter case may be separated from the case 2 and disposed in a housing different from the driving force source room Q.

(6) The embodiment above has been described by exemplifying the structure in which the inverter control device 5 individually determines the offset correction amount ΔOc in each of the divided periods Td defined by dividing the electrical angle period Tc of the pump motor PM. The embodiments of the present disclosure are, however, not limited to this structure. For example, the inverter control device 5 may determine a uniform value of the offset correction amount ΔOc for the entire electrical angle period Tc of the pump motor PM, without setting the divided periods Td.

(7) The embodiment above has been described by exemplifying the structure in which the carrier frequency in the PWM control is continuously changeable. The embodiment above has also been described by exemplifying the structure in which, if the lower full-on period Tn is shorter than the reference time Tr, the inverter control device 5 reduces the carrier frequency to a frequency at which the lower full-on period Tn is equal to the reference time Tr. The embodiments of the present disclosure are, however, not limited to these structures. For example, an embodiment may be structured such that the carrier frequency in the PWM control is changeable in a step-like manner. In this case, if the lower full-on period Tn is shorter than the reference time Tr, the inverter control device 5 preferably reduces the carrier frequency to the highest frequency in a range of the carrier frequency changeable in a step-like manner at which the lower full-on period Tn is not shorter than the reference time Tr. In either of the structures in which the carrier frequency is changeable in a continuous manner or a step-like manner, the inverter control device 5 may reduce the carrier frequency to any frequency at which the lower full-on period Tn is not shorter than the reference time Tr.

(8) The embodiment above has been described by exemplifying the structure in which, if the lower full-on period Tn is shorter than the reference time Tr, the inverter control device 5 performs the field-weakening control to reduce the modulation factor Mf. The embodiments of the present disclosure are, however, not limited to this structure. For example, in a structure in which a voltage boosting circuit is provided between the electric storage device B and the capacitor C, the inverter control device 5 may control the voltage boosting circuit to raise the direct-current voltage Vdc so as to reduce the modulation factor Mf.

(9) It should be understood that the other structures of the embodiments disclosed herein are also merely examples in all respects, and the scope of the present disclosure is not limited by those embodiments. Those skilled in the art will easily understand that appropriate modifications can be made without departing from the gist of the present disclosure. Accordingly, the scope of the present disclosure naturally includes also other embodiments that are modified without departing from the gist of the present disclosure.

(10) Moreover, in addition to the drive device according to the present disclosure, the inverter control device having the function of accurately detecting the currents flowing in the stator coils of the respective phases of the alternating-current rotary electric machine using the shunt resistors has the following major characteristic features.

The inverter control device 5 controlling drive of the inverter that is connected to the electric storage device B serving as the direct-current power supply and to the alternating-current rotary electric machine driven by an N-phase alternating current (N is a natural number of 2 or more) and that performs direct-current/alternating-current conversion has a first characteristic feature of:

including N or (N−1) shunt resistors 45 detecting the currents flowing in the alternating-current rotary electric machine between the electric pole line Lp or Ln of the electric storage device B and the switching elements for the respective phases included in the inverter;

controlling the alternating-current rotary electric machine by PWM control by individually controlling the switching of the upper switching elements and the lower switching elements; and performing the current detection process of detecting the currents flowing in the stator coils of the respective phases of the alternating-current rotary electric machine during the target full-on period in which the switching elements on the installation side provided with the shunt resistors 45 for the respective phases are all ON.

In such a structure, the inverter control device 5 has a second characteristic feature of performing any one or a combination of more than one of the following items (a) to (c).

(a) Determining the offset correction amount $\Delta Oc$ at the zero point in the current detection process during the target full-off period in which the switching elements for the respective phases provided on the installation side are all OFF.

(b) Reducing the carrier frequency in the PWM control if the target full-on period is shorter than the predetermined reference time Tr.

(c) Reducing the modulation factor Mf representing the ratio of the effective value of the alternating-current voltage commands Vu, Vv, and Vw to the direct-current voltage Vdc of the inverter if the target full-on period is shorter than the predetermined reference time Tr.

The inverter control device having these characteristic structures can also provide the various operational advantages related to the drive device described in the embodiments above. In this case, the several additional techniques illustrated as the examples of preferable structures for the drive device described in the embodiments above can be incorporated in the inverter control device. If the several additional techniques are incorporated, the operational advantages corresponding thereto can be obtained. The inverter control device as described above can naturally be used not only in the drive device for a vehicle, but also in various devices (such as electrical appliances and large industrial equipment) each including an inverter for controlling an alternating-current rotary electric machine driven by a multi-phase alternating current.

INDUSTRIAL APPLICABILITY

The present disclosure can be used, for example, for a drive device for a hybrid vehicle.

The invention claimed is:

1. A drive device including a wheel driving rotary electric machine drivingly connected to wheels, a first inverter that is connected to a direct-current power supply and the wheel driving rotary electric machine and performs conversion between a direct current and an alternating current, an alternating-current rotary electric machine that is drivingly connected to a rotating body provided independent of the wheels and in which currents of a plurality of phases flow, and a second inverter that includes second switching element units for respective phases corresponding to the respective phases, and that is connected to the direct-current power supply and the alternating-current rotary electric machine and performs conversion between a direct current and an alternating current, the drive device comprising:
a current sensor that detects a current flowing in the wheel driving rotary electric machine; and
shunt resistors that detect currents flowing in the respective second switching element units for the corresponding phases between the direct-current power supply and the second switching element units for the respective phases, wherein
a ratio of a period during which current detection can be performed by the current sensor to a control period of the first inverter is higher than a ratio of a period during which current detection can be performed by the shunt resistors to a control period of the second inverter.

2. The drive device according to claim 1, wherein
the wheel driving rotary electric machine is structured such that currents of a plurality of phases flow therein, and the first inverter includes first switching element units for respective phases corresponding to the respective phases, and
the current sensor is provided at any place on a wiring member connecting corresponding one of the first switching element units for the respective phases to a stator coil of a corresponding phase of the wheel driving rotary electric machine.

3. The drive device according to claim 2, wherein the current sensor is a sensor using a Hall element.

4. The drive device according to claim 2, further comprising a drive transmission device that operates with hydraulic pressure supplied thereto and controls a transmission state of driving force from a driving force source of the wheels to the wheels, wherein
the rotating body is a rotor of an electric pump that discharges oil supplied to the drive transmission device.

5. The drive device according to claim 2, wherein
the alternating-current rotary electric machine is structured such that N-phase currents (N is a natural number of 2 or more) flow therein,
a positive electrode of the direct-current power supply is connected to the second switching element units for the respective phases through a common positive line common to the N second switching element units for the respective phases and N positive branch lines branching from the common positive line and connected to the respective second switching element units for the respective phases, and a negative electrode of the direct-current power supply is connected to the second switching element units for the respective phases through a common negative line common to the N second switching element units for the respective phases and N negative branch lines branching from the common negative line and connected to the respective second switching element units for the respective phases, and
the shunt resistors are provided in respective N or (N−1) negative branch lines.

6. The drive device according to claim 2, further comprising an inverter control device that controls drive of the second inverter, wherein
each of the second switching element units for the respective phases includes an upper switching element and a lower switching element, the upper switching element being provided closer to the positive electrode of the direct-current power supply than a connection part of the switching element unit to the alternating-current rotary electric machine, the lower switching element being provided closer to the negative electrode of the direct-current power supply than the connection part,
each of the shunt resistors is provided so as to detect a current flowing in the lower switching element of corresponding one of the second switching element units for the respective phases, and
the inverter control device
controls the alternating-current rotary electric machine by PWM control by individually controlling switching of the upper switching element and the lower switching element of each of the second switching element units for the respective phases,
performs a current detection process of detecting the currents of the respective phases flowing in the alternating-current rotary electric machine based on an electric potential difference between both ends of each of the shunt resistors during a lower full-on period in which the lower switching elements of the second switching element units for the respective phases are all ON, and determines an offset correction amount at a zero point in the current detection process based on the electric potential difference between both ends of each of the shunt resistors during a lower full-off period in which the lower switching elements of the second switching element units for the respective phases are all OFF.

7. The drive device according to claim 2, further comprising an inverter control device that controls drive of the second inverter, wherein each of the second switching element units for the respective phases includes an upper switching element and a lower switching element, the upper switching element being provided closer to the positive electrode of the direct-current power supply than a connection part of the switching element unit to the alternating-current rotary electric machine, the lower switching element being provided closer to the negative electrode of the direct-current power supply than the connection part, each of the shunt resistors is provided so as to detect a current flowing in the lower switching element of corresponding one of the second switching element units for the respective phases, and the inverter control device
controls the alternating-current rotary electric machine by pulse-width modulation (PWM) control by individually controlling switching of the upper switching element and the lower switching element of each of the second switching element units for the respective phases, performs a current detection process of detecting the currents of the respective phases flowing in the alternating-current rotary electric machine based on an electric potential difference between both ends of each of the shunt resistors during a lower full-on period in which the lower switching elements of the second switching element units for the respective phases are all ON, and reduces a carrier frequency in the PWM control when the lower full-on period is shorter than a predetermined reference time.

8. The drive device according to claim 2, further comprising an inverter control device that controls drive of the second inverter, wherein each of the second switching element units for the respective phases includes an upper switching element and a lower switching element, the upper switching element being provided on the positive electrode side of the direct-current power supply with respect to a connection part of the switching element unit and the alternating-current rotary electric machine, the lower switching element being provided on the negative electrode side of the direct-current power supply with respect to the connection part, each of the shunt resistors is provided so as to detect a current flowing in the lower switching element of corresponding one of the second switching element units for the respective phases, and the inverter control device
controls the alternating-current rotary electric machine by PWM control by individually controlling switching of the upper switching element and the lower switching element of each of the second switching element units for the respective phases based on alternating-current voltage commands that are commands for alternating-current voltages of a plurality of phases, performs a current detection process of detecting the currents of the respective phrases flowing in the alternating-current rotary electric machine based on an electric potential difference between both ends of each of the shunt resistors during a lower full-on period in which the lower switching elements of the second switching element units for the respective phases are all ON, and reduces a modulation factor representing a ratio of an effective value of the alternating-current voltage commands to a voltage on the direct-current side of the second inverter when the lower full-on period is shorter than a predetermined reference time.

9. The drive device according to claim 1, wherein the current sensor is a sensor using a Hall element.

10. The drive device according to claim 9, further comprising a drive transmission device that operates with hydraulic pressure supplied thereto and controls a transmission state of driving force from a driving force source of the wheels to the wheels, wherein the rotating body is a rotor of an electric pump that discharges oil supplied to the drive transmission device.

11. The drive device according to claim 9, wherein the alternating-current rotary electric machine is structured such that N-phase currents (N is a natural number of 2 or more) flow therein, a positive electrode of the direct-current power supply is connected to the second switching element units for the respective phases through a common positive line common to the N second switching element units for the respective phases and N positive branch lines branching from the common positive line and connected to the respective second switching element units for the respective phases, and a negative electrode of the direct-current power supply is connected to the second switching element units for the respective phases through a common negative line common to the N second switching element units for the respective phases and N negative branch lines branching from the common negative line and connected to the respective second switching element units for the respective phases, and the shunt resistors are provided in respective N or (N−1) negative branch lines.

12. The drive device according to claim 9, further comprising an inverter control device that controls drive of the second inverter, wherein each of the second switching element units for the respective phases includes an upper switching element and a lower switching element, the upper switching element being provided closer to the positive electrode of the direct-current power supply than a connection part of the switching element unit to the alternating-current rotary electric machine, the lower switching element being provided closer to the negative electrode of the direct-current power supply than the connection part, each of the shunt resistors is provided so as to detect a current flowing in the lower switching element of corresponding one of the second switching element units for the respective phases, and the inverter control device
- controls the alternating-current rotary electric machine by PWM control by individually controlling switching of the upper switching element and the lower switching element of each of the second switching element units for the respective phases,
- performs a current detection process of detecting the currents of the respective phases flowing in the alternating-current rotary electric machine based on an electric potential difference between both ends of each of the shunt resistors during a lower full-on period in which the lower switching elements of the second switching element units for the respective phases are all ON, and
- determines an offset correction amount at a zero point in the current detection process based on the electric potential difference between both ends of each of the shunt resistors during a lower full-off period in which the lower switching elements of the second switching element units for the respective phases are all OFF.

13. The drive device according to claim 1, further comprising a drive transmission device that operates with hydraulic pressure supplied thereto and controls a transmission state of driving force from a driving force source of the wheels to the wheels, wherein
the rotating body is a rotor of an electric pump that discharges oil supplied to the drive transmission device.

14. The drive device according to claim 1, wherein
the alternating-current rotary electric machine is structured such that N-phase currents (N is a natural number of 2 or more) flow therein,
a positive electrode of the direct-current power supply is connected to the second switching element units for the respective phases through a common positive line common to the N second switching element units for the respective phases and N positive branch lines branching from the common positive line and connected to the respective second switching element units for the respective phases, and a negative electrode of the direct-current power supply is connected to the second switching element units for the respective phases through a common negative line common to the N second switching element units for the respective phases and N negative branch lines branching from the common negative line and connected to the respective second switching element units for the respective phases, and
the shunt resistors are provided in respective N or (N−1) negative branch lines.

15. The drive device according to claim 1, further comprising an inverter control device that controls drive of the second inverter, wherein
each of the second switching element units for the respective phases includes an upper switching element and a lower switching element, the upper switching element being provided closer to the positive electrode of the direct-current power supply than a connection part of the switching element unit to the alternating-current rotary electric machine, the lower switching element being provided closer to the negative electrode of the direct-current power supply than the connection part,
each of the shunt resistors is provided so as to detect a current flowing in the lower switching element of corresponding one of the second switching element units for the respective phases, and
the inverter control device
- controls the alternating-current rotary electric machine by PWM control by individually controlling switching of the upper switching element and the lower switching element of each of the second switching element units for the respective phases,
- performs a current detection process of detecting the currents of the respective phases flowing in the alternating-current rotary electric machine based on an electric potential difference between both ends of each of the shunt resistors during a lower full-on period in which the lower switching elements of the second switching element units for the respective phases are all ON, and
- determines an offset correction amount at a zero point in the current detection process based on the electric potential difference between both ends of each of the shunt resistors during a lower full-off period in which the lower switching elements of the second switching element units for the respective phases are all OFF.

16. The drive device according to claim 15, wherein the inverter control device individually determines the offset correction amount for each of the shunt resistors in each of a plurality of divided periods defined by dividing an electrical angle period of the alternating-current rotary electric machine.

17. The drive device according to claim 1, further comprising an inverter control device that controls drive of the second inverter, wherein
each of the second switching element units for the respective phases includes an upper switching element and a lower switching element, the upper switching element being provided closer to the positive electrode of the direct-current power supply than a connection part of the switching element unit to the alternating-current rotary electric machine, the lower switching element being provided closer to the negative electrode of the direct-current power supply than the connection part,
each of the shunt resistors is provided so as to detect a current flowing in the lower switching element of corresponding one of the second switching element units for the respective phases, and
the inverter control device
- controls the alternating-current rotary electric machine by pulse-width modulation (PWM) control by individually controlling switching of the upper switching element and the lower switching element of each of the second switching element units for the respective phases,
- performs a current detection process of detecting the currents of the respective phases flowing in the alternating-current rotary electric machine based on an electric potential difference between both ends of each of the shunt resistors during a lower full-on period in which the lower switching elements of the second switching element units for the respective phases are all ON, and
- reduces a carrier frequency in the PWM control when the lower full-on period is shorter than a predetermined reference time.

18. The drive device according to claim 17, wherein the inverter control device is structured such that the carrier frequency can be changed in a continuous manner or a step-like manner, and when the lower full-on period is shorter than the reference time, reduces the carrier frequency to a highest frequency in a range of the changeable carrier frequency at which the lower full-on period is not shorter than the reference time.

19. The drive device according to claim 1, further comprising an inverter control device that controls drive of the second inverter, wherein each of the second switching element units for the respective phases includes an upper switching element and a lower switching element, the upper switching element being provided on the positive electrode side of the direct-current power supply with respect to a connection part of the switching element unit and the alternating-current rotary electric machine, the lower switching element being provided on the negative electrode side of the direct-current power supply with respect to the connection part, each of the shunt resistors is provided so as to detect a current flowing in the lower switching element of corresponding one of the second switching element units for the respective phases, and the inverter control device controls the alternating-current rotary electric machine by PWM control by individually controlling switching of the upper switching element and the lower switching element of each of the second switching element units for the respective phases based on alternating-current voltage commands that are commands for alternating-current voltages of a plurality of phases, performs a current detection process of detecting the currents of the respective phrases flowing in the alternating-current rotary electric machine based on an electric potential difference between both ends of each of the shunt resistors during a lower full-on period in which the lower switching elements of the second switching element units for the respective phases are all ON, and reduces a modulation factor representing a ratio of an effective value of the alternating-current voltage commands to a voltage on the direct-current side of the second inverter when the lower full-on period is shorter than a predetermined reference time.

20. The drive device according to claim 19, wherein the inverter control device is structured to control the alternating-current rotary electric machine by current vector control, and reduces the modulation factor by performing field-weakening control to adjust the alternating-current voltage commands so as to change a magnetic field generated by stator coils of the alternating-current rotary electric machine to have a direction of weakening a magnetic field flux of a rotor.

* * * * *